(12) United States Patent
Tobiyama et al.

(10) Patent No.: US 8,264,826 B2
(45) Date of Patent: Sep. 11, 2012

(54) ELECTRONIC APPARATUS AND BATTERY PACK

(75) Inventors: Ryosuke Tobiyama, Tokyo (JP); Akira Hanatsuka, Tokyo (JP)

(73) Assignee: Sony Corporation, Tokyo (JP)

( * ) Notice: Subject to any disclaimer, the term of this patent is extended or adjusted under 35 U.S.C. 154(b) by 382 days.

(21) Appl. No.: 12/574,178

(22) Filed: Oct. 6, 2009

(65) Prior Publication Data

US 2010/0165555 A1 Jul. 1, 2010

(30) Foreign Application Priority Data

Dec. 26, 2008 (JP) ................................. 2008-335341

(51) Int. Cl.
*H05K 7/16* (2006.01)
(52) U.S. Cl. .................................. 361/679.02; 248/917
(58) Field of Classification Search ............. 361/679.01, 361/679.02, 8, 679.09, 679.21, 679.26, 724–727, 361/679.58; 248/917–924
See application file for complete search history.

(56) References Cited

U.S. PATENT DOCUMENTS

| 5,251,105 | A | * | 10/1993 | Kobayashi et al. | ...... 361/679.58 |
| 5,841,630 | A | * | 11/1998 | Seto et al. | ................ 361/679.58 |
| 7,630,742 | B2 | * | 12/2009 | Park et al. | .................. 455/575.1 |
| 7,715,189 | B2 | * | 5/2010 | Iida et al. | ................ 361/679.55 |
| 2007/0121284 | A1 | | 5/2007 | Iida et al. | |

FOREIGN PATENT DOCUMENTS

JP 2007-115091 5/2007

* cited by examiner

*Primary Examiner* — Jinhee Lee
*Assistant Examiner* — Ingrid Wright
(74) *Attorney, Agent, or Firm* — Oblon, Spivak, McClelland, Maier & Neustadt, L.L.P.

(57) ABSTRACT

An electronic apparatus includes: a main body including a battery pack mounting portion at an end in a direction; a display portion to be openable to the main body via a hinge portion provided at an end in the direction; a battery pack detachable from the battery pack mounting portion along the direction; a first connector portion provided at a position of the battery pack mounting portion on the end side in the direction; a second connector portion provided to the battery pack and connectable to the first connector portion; a first engagement portion provided at another end of the battery pack mounting portion in the direction; a second engagement portion provided to the battery pack and capable of being engaged with the first engagement portion relatively in the direction; and a notch portion provided at an end of the battery pack in the direction, for avoiding the hinge portion.

16 Claims, 23 Drawing Sheets

FIG.7A
FIG.7B
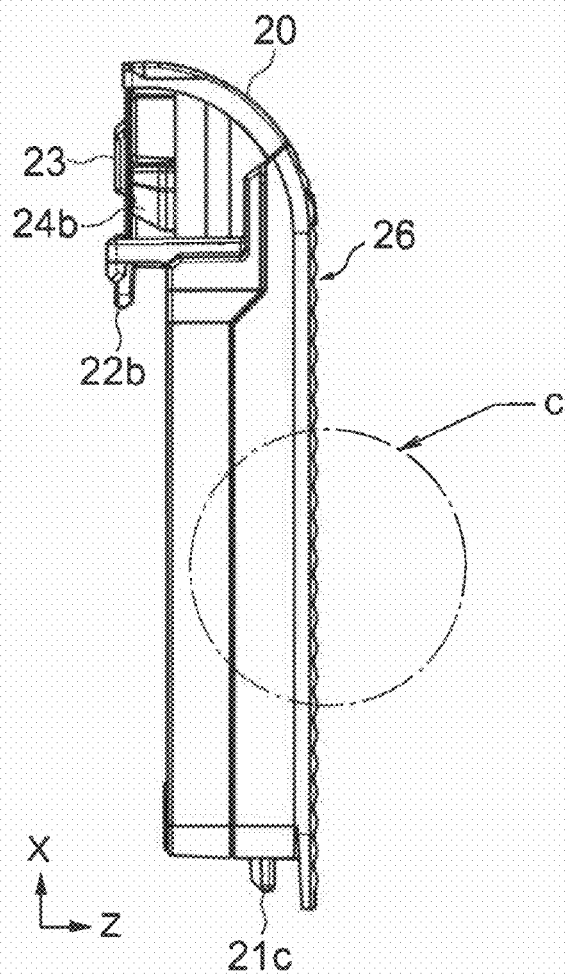
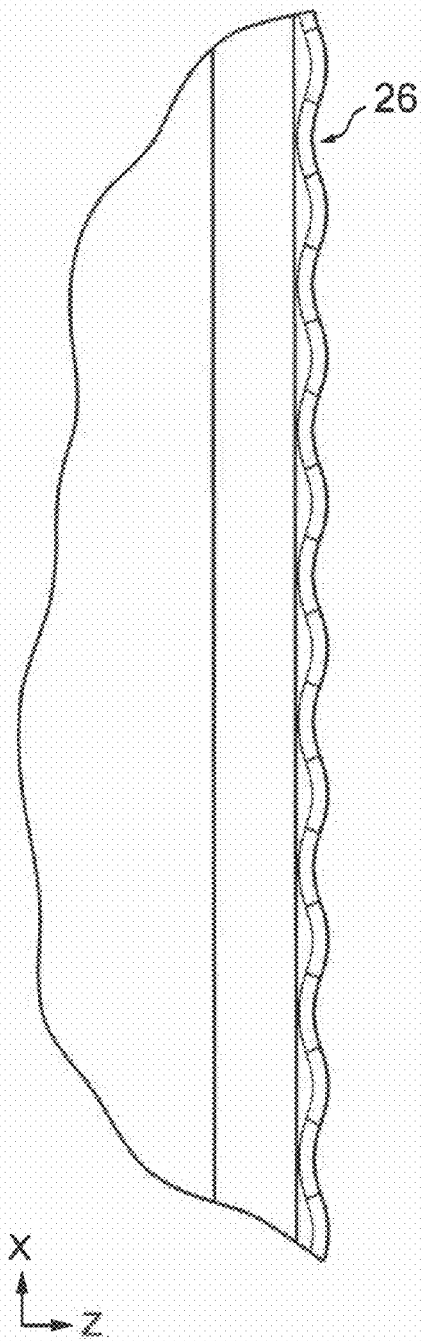

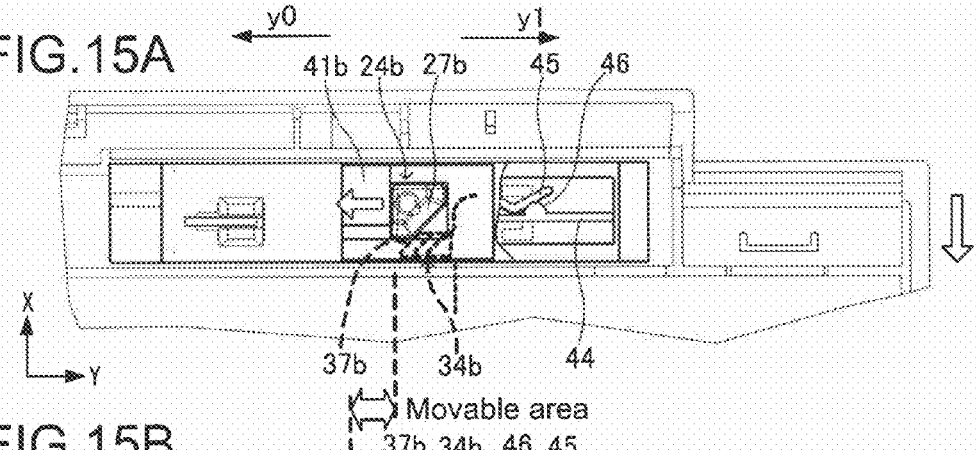
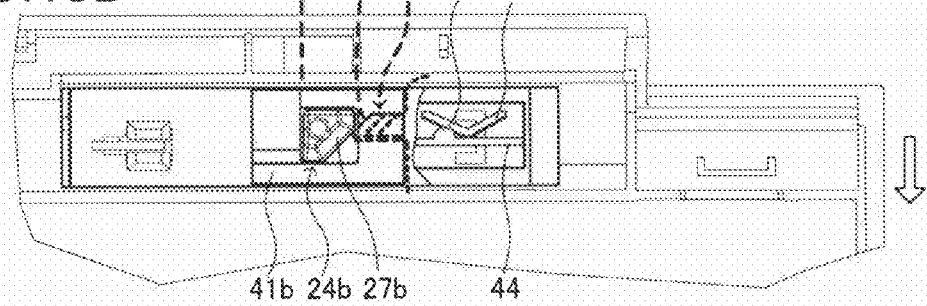
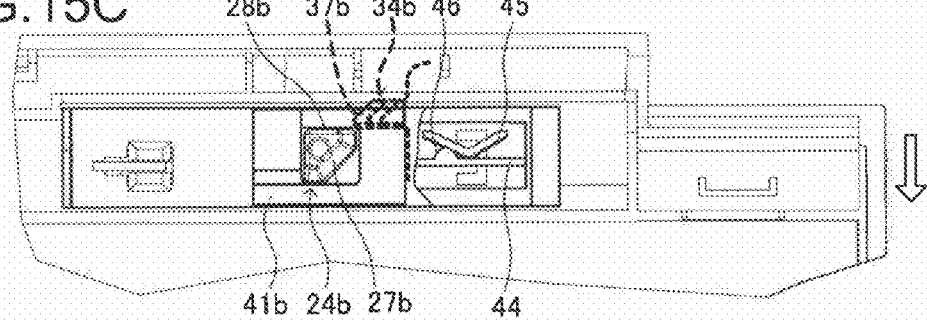
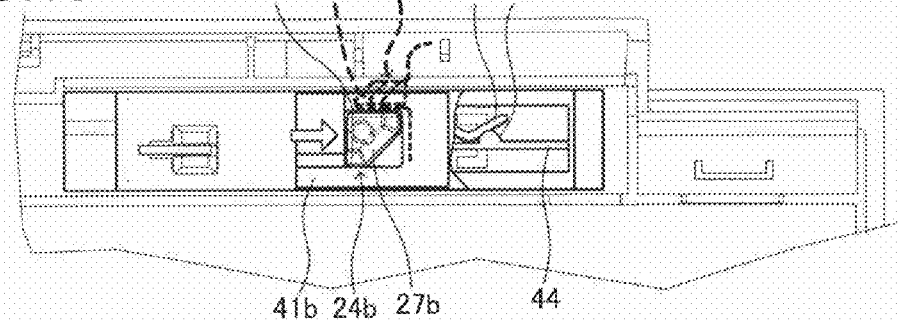

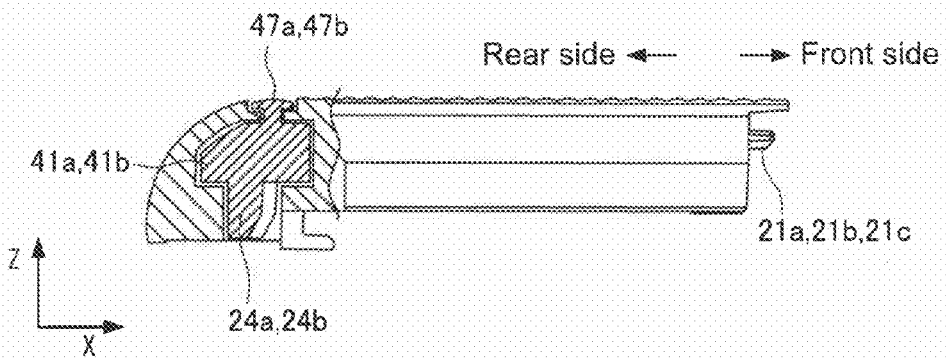
FIG.22
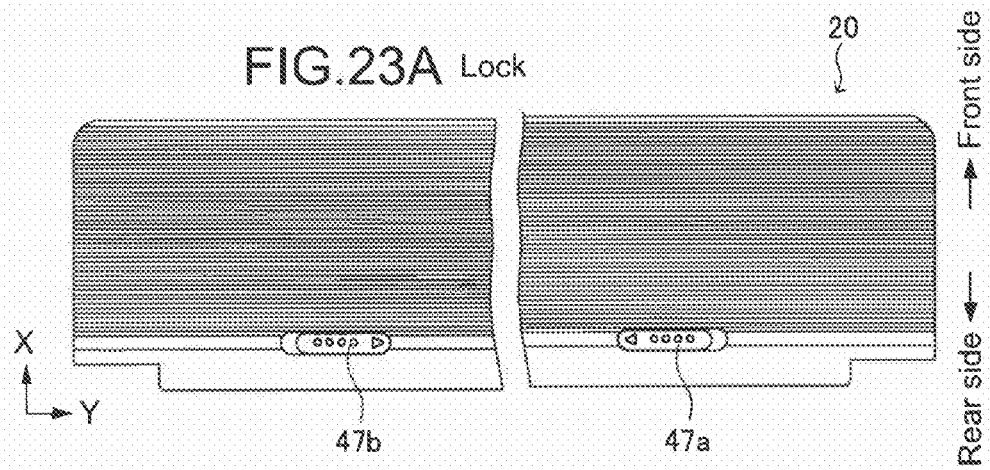
FIG.23A Lock
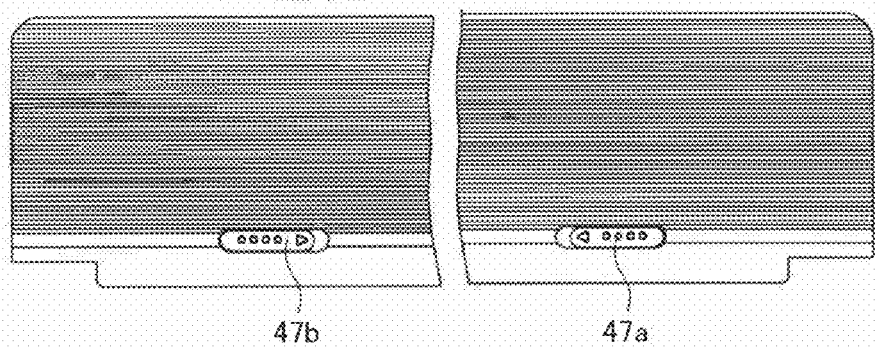
FIG.23B Release

ELECTRONIC APPARATUS AND BATTERY PACK

BACKGROUND OF THE INVENTION

1. Field of the Invention

The present invention relates to an electronic apparatus such as a laptop personal computer, and a battery pack detachable from the electronic apparatus.

2. Description of the Related Art

Dominant laptop personal computers are capable of detaching battery packs therefrom. For example, a battery pack mounting portion to which a detachable battery pack is mounted is provided on a back surface of a main body of a laptop personal computer. The battery pack is inserted in a direction substantially parallel to a bottom surface of the main body of the laptop personal computer, thus being mounted to the battery pack mounting portion. The battery pack mounting portion includes a connector. By connecting the connector and a connector included in the battery pack to each other, the main body of the laptop personal computer and the battery pack are connected to each other (see Japanese Patent Application Laid-open No. 2007-115091 (paragraph [0019], FIG. 2)).

SUMMARY OF THE INVENTION

In the technique described above, however, it is necessary to provide grooves or projecting rails for guiding insertion of the battery pack into the battery pack mounting portion on both internal side surfaces of the battery pack mounting portion and both side surfaces of the battery pack. Therefore, each size of the battery pack mounting portion and the battery pack is made larger by the thickness of the grooves or projecting rails. The grooves or the projecting rails are necessary to be thick to some extent because they receive a relatively-large load when the battery pack is mounted. Accordingly, downsizing of the laptop personal computer, in particular, thinning thereof is hindered.

In view of the circumstances as described above, there is a need for an electronic apparatus of a small size from which a battery pack is detached easily, and a battery pack.

According to an embodiment of the present invention, there is provided an electronic apparatus including: a main body that includes a battery pack mounting portion at an end portion in a first coordinate axis direction; a display portion that is provided to be openable with respect to the main body via a hinge portion provided at an end portion in the first coordinate axis direction; a battery pack that is detachable from the battery pack mounting portion along the first coordinate axis direction; a first connector portion that is provided at a position of the battery pack mounting portion on the end portion side in the first coordinate axis direction; a second connector portion that is provided to the battery pack and connectable to the first connector portion; a first engagement portion that is provided at another end portion of the battery pack mounting portion in the first coordinate axis direction; a second engagement portion that is provided to the battery pack and capable of being engaged with the first engagement portion by being fit into the first engagement portion relatively in the first coordinate axis direction; and a notch portion to avoid the hinge portion, the notch portion being provided at an end portion of the battery pack in the first coordinate axis direction.

In the electronic apparatus according to the embodiment of the present invention, when the battery pack is mounted to the battery pack mounting portion, the battery pack is inserted such that the second engagement portion at a front end in the insertion direction (first coordinate axis direction) of the battery pack is aligned with the first engagement portion of the battery pack mounting portion. In this case, because a degree of freedom in selection of attitudes in which the battery pack is inserted is high, it is possible to insert the battery pack with the front-end side thereof in the insertion direction being tilted more downwardly than a back-end side thereof. That is, a tolerance range of variations in the insertion attitude of the battery pack becomes greater. For example, in a structure in which guides along an insertion direction are provided on both side surfaces of a battery pack mounting portion and a battery pack in a width direction, the attitude in which the battery pack is inserted into the battery pack mounting portion is restricted. In contrast to this, according to the embodiment of the present invention, the restriction of the attitude of the battery pack is relieved because the guides along the insertion direction are unnecessary.

Further, by providing the notch portion for avoiding the hinge portion at a position of the battery pack on the rear side, the hinge portion supporting the display portion in an openable manner, it becomes unnecessary to secure a space for arranging the hinge portion in the main body portion, with the result that the entire size of the electronic apparatus can be reduced. In addition, a degree of freedom in selection of positions at which the hinge portion is provided is increased. Furthermore, in a case where the notch portion for avoiding the hinge portion is provided to the battery pack, it is necessary for the hinge portion not to disturb detachment of the battery pack from the battery pack mounting portion. In the electronic apparatus according to the embodiment of the present invention, because a degree of freedom in selection of attitudes in which the battery pack is inserted is high, it is possible to avoid interference with the hinge portion when the battery pack is detached.

Moreover, by providing the connector portions of the battery pack mounting portion and the battery pack at another end in a direction opposite to the first coordinate axis direction, both the connector portions can be coupled to each other by a light force caused by an action of moment, when the battery pack is mounted to the battery pack mounting portion by rotating the back-end side of the battery pack downwardly with the front-end side thereof (one end in first coordinate axis direction) as a fulcrum at a time immediately before the mounting is completed.

The electronic apparatus according to the embodiment of the present invention may further include: a first movable portion that is provided at a position of the battery pack on the end portion side in the first coordinate axis direction to be movable in a second coordinate axis direction perpendicular to the first coordinate axis direction; a first movable portion interference portion that is provided to the battery pack mounting portion, and interferes with the first movable portion and temporality retreats the first movable portion in the second coordinate axis direction from a first position in which a detachment of the battery pack from the battery pack mounting portion is restricted, to a second position in which the detachment is allowed when the battery pack is mounted; and a bias portion to bias the first movable portion in a direction opposite to the retreat direction by the interference with the first movable portion interference portion.

In the electronic apparatus according to the embodiment of the present invention, when the battery pack is mounted to the battery pack mounting portion, the battery pack is inserted such that the second engagement portion at the front end in the insertion direction of the battery pack is aligned with the first engagement portion of the battery pack mounting portion. When the battery pack is inserted into the battery pack mounting portion with this insertion attitude being held, the first movable portion interference portion of the battery pack mounting portion interferes with the first movable portion of the battery pack. Due to the interference of the first movable portion interference portion, the first movable portion of the battery pack is temporality moved from the first position in which the detachment of the battery pack from the battery pack mounting portion is restricted, to the second position in which the detachment is allowed. When the battery pack is inserted into the battery pack mounting portion more deeply, the first movable portion of the battery pack is brought to a state free from the interference of the first movable portion interference portion. Accordingly, the first movable portion is restored, by a bias force of the bias portion, to the first position in which the detachment of the battery pack is restricted, with the result that the mounting of the battery pack is completed. In the electronic apparatus employing the structure as described above, a tolerance range of variations in the insertion attitude of the battery pack becomes greater. For example, in a structure in which guides along the insertion direction are provided on both side surfaces of the battery pack mounting portion and the battery pack in a width direction, the insertion attitude of the battery pack is restricted from an early stage at which the battery pack is inserted into the battery pack mounting portion. In contrast to this, in the electronic apparatus according to the embodiment of the present invention, the restriction of the attitude of the battery pack is relieved at least at the early stage because the guides along the insertion direction are unnecessary. In addition, downsizing is made easier because the guides along the insertion direction on both the side surfaces of the battery pack mounting portion and the battery pack in the width direction are unnecessary.

In the electronic apparatus according to the embodiment of the present invention, each of the first movable portion and the first movable portion interference portion may include a tapered surface that is tilted with respect to three reference surfaces formed by three coordinate axes including the first coordinate axis and the second coordinate axis. Accordingly, the restriction of the insertion attitude of the battery pack can be relieved more.

The electronic apparatus according to the embodiment of the present invention may further include: a second movable portion that is provided at a position of the battery pack on the end portion side in the first coordinate axis direction to be movable independently of the first movable portion in the second coordinate axis direction perpendicular to the first coordinate axis direction; a second movable portion interference portion that is provided to the battery pack mounting portion, and interferes with the second movable portion and temporality retreats the second movable portion in the second coordinate axis direction from a third position in which the detachment of the battery pack from the battery pack mounting portion is restricted, to a fourth position in which the detachment is allowed when the battery pack is mounted; and a restriction portion to restrict a movement in a direction opposite to the retreat direction of the second movable portion that has been retreated by the interference with the second movable portion interference portion. By adding this structure, the battery pack inserted into the battery pack mounting portion can be locked while holding the mounted state.

The electronic apparatus according to the embodiment of the present invention may further include a restriction release operation portion to manually cancel a restriction state of the second movable portion, the restriction state being caused by the restriction portion.

As described above, according to the embodiment of the present invention, it is possible to provide an electronic apparatus of a small size from which a battery pack is detached easily.

These and other objects, features and advantages of the present invention will become more apparent in light of the following detailed description of best mode embodiments thereof, as illustrated in the accompanying drawings.

BRIEF DESCRIPTION OF DRAWINGS

FIGS. 7A and 7B are a side view of the battery pack shown in FIG. 5 viewed in a Y-axis direction and a partially-enlarged view thereof;

FIGS. 15A to 15D are views showing a relationship between a movable portion in the "b" portion of the battery pack and a movable portion interference piece in a "B" portion of the battery pack mounting portion;

FIG. 22 is a cross-sectional view of the movable portion of the battery pack;

FIGS. 23A and 23B are plan views showing a lock position and a release position of slide operation portions of the battery pack;

DESCRIPTION OF PREFERRED EMBODIMENTS

Hereinafter, an embodiment of the present invention will be described with reference to the drawings.

In this embodiment, a laptop personal computer will be taken as an example of an electronic apparatus.

(Structure of Electronic Apparatus)

Figure 1:
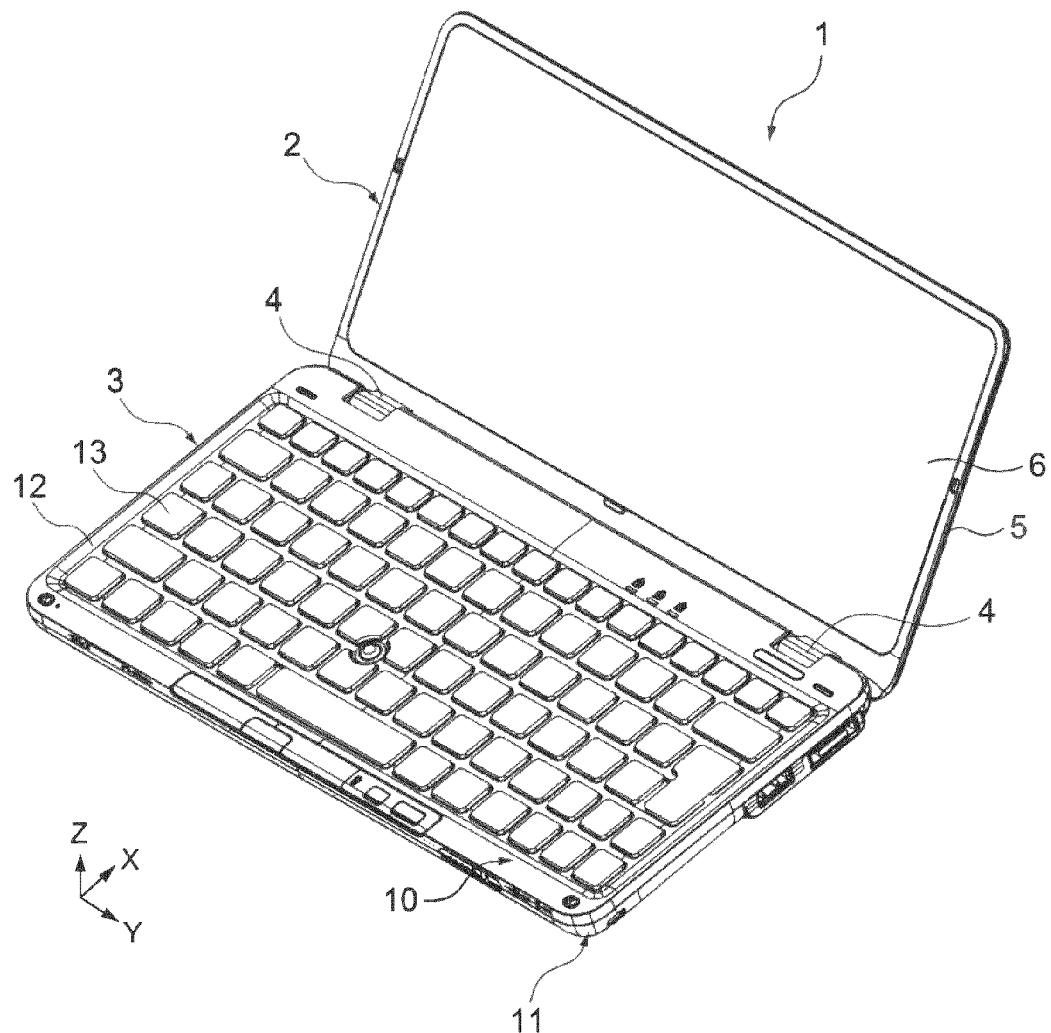
FIG. 1 is a perspective view of an electronic apparatus according to an embodiment of the present invention in an open state.

FIG. 1 is a perspective view of an electronic apparatus according to an embodiment of the present invention in an open state.

An electronic apparatus 1 includes a display portion 2, a main body portion 3, and hinges 4 that couple the display portion 2 and the main body portion 3.

The display portion 2 is openable with respect to the main body portion 3 via the hinges 4. The display portion 2 includes a display-side casing 5, a display screen 6, and a display processing unit (not shown) that is provided inside the display-side casing 5 and performs display processing.

The display-side casing 5 is a casing of the display portion 2 that accommodates the display processing unit (not shown). The display screen 6 is a screen for displaying information and faces the main body portion 3 in a closed state. Two hinges 4 are attached to the display-side casing 5. The display portion 2 is rotatably provided to the main body portion 3 by those hinges 4.

The main body portion 3 includes a palm rest unit 10 (keyboard unit) constituting an upper surface side of the main body portion 3 and a main body unit 11 constituting a bottom surface side of the main body portion 3. The main body portion 3 is obtained by integrating the palm rest unit 10 and the main body unit 11. The palm rest unit 10 and the main body unit 11 are each constituted of a plurality of members, but there are formed no visible screws and the like on exterior surfaces.

The main body unit 11 is equipped with a printed board onto which a plurality of electronic components etc. are mounted, a heat dissipation unit, various drives including a hard disk drive, and the like. Onto the printed board, a CPU (Central Processing Unit), a memory, and other electronic components are mounted.

The palm rest unit 10 includes a palm rest 12 as a first exterior member and a keyboard 13. The palm rest 12 is a rectangular plate-like exterior member and forms an exterior surface of the main body portion 3. The palm rest 12 is formed with a plurality of through-holes into which keys of the keyboard 13 are inserted. In other words, those through-holes are formed at positions corresponding to positions of the respective keys.

The keyboard 13 functions as an input portion of the electronic apparatus 1 and incorporates a sheet switch (not shown) made of, for example, PET and the like. The keyboard 13 includes the plurality of keys on an upper surface side thereof.

Figure 2:
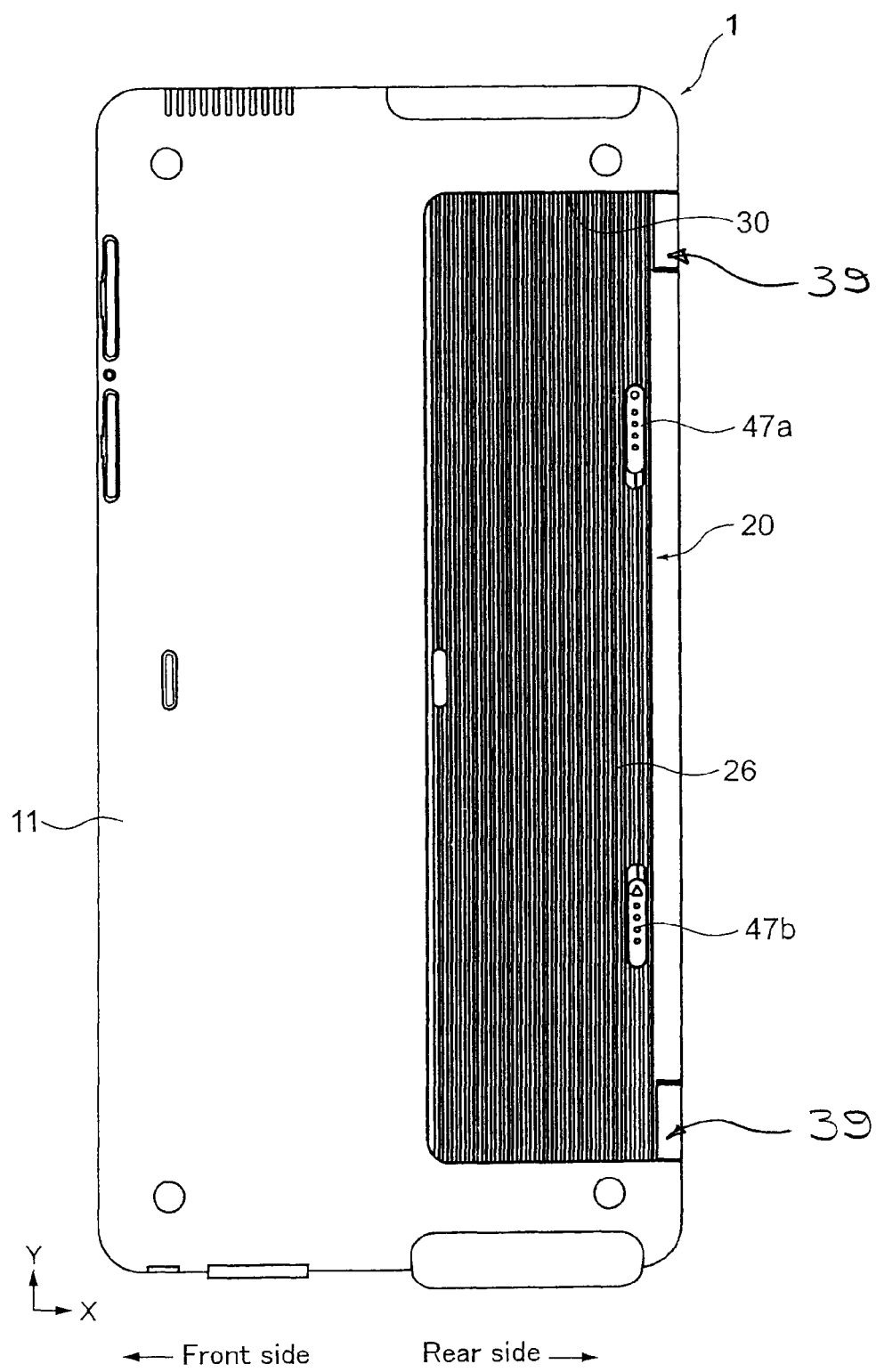
FIG. 2 is a plan view of a back surface of the electronic apparatus shown in FIG. 1.
Figure 3:
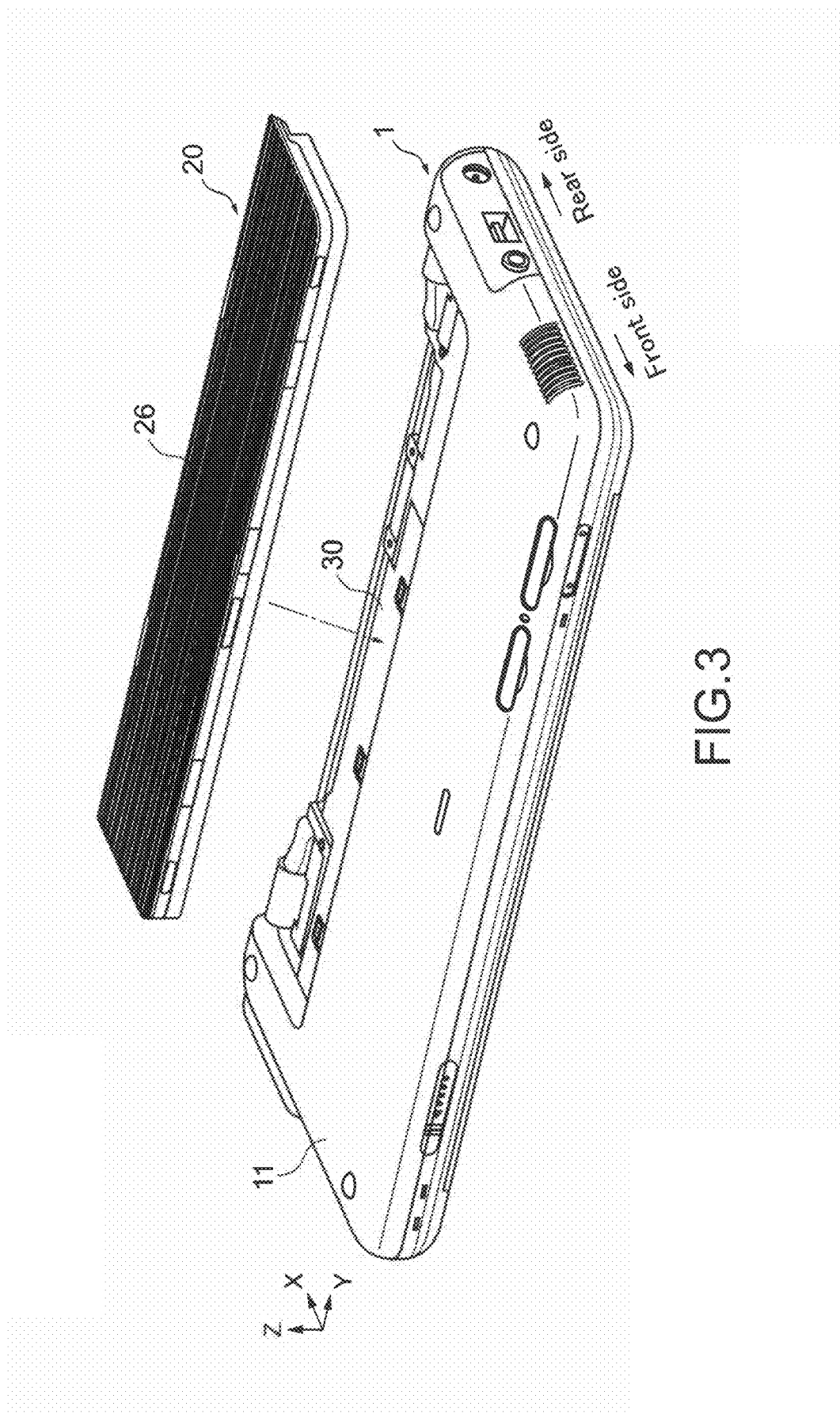
FIG. 3 is a perspective view of a state where the electronic apparatus shown in FIG. 1 and a battery pack are separated.

FIG. 2 is a plan view of a back surface of the electronic apparatus 1 shown in FIG. 1. In FIG. 2, the left-hand side thereof is a front side of the electronic apparatus 1 when seen by a user and the right-hand side thereof is a rear side of the electronic apparatus 1 when seen by the user. As shown in FIG. 2, the electronic apparatus 1 includes a battery pack 20 that is detachable from the main body portion 3 (main body unit 11). As the battery pack 20, for example, a lithium ion polymer battery is used. FIG. 3 is a perspective view of a state where the battery pack 20 is taken out from the electronic apparatus 1. Provided on a back surface of the main body portion 3 (main body unit 11) of the electronic apparatus 1 on the rear side is a battery pack mounting portion 30 as a concave space from which the battery pack 20 can be detached. When the battery pack 20 is being mounted to the battery pack mounting portion 30, an exterior surface of the battery pack 20 is seen as a part of the exterior surface of the back surface of the main body unit 11.

(Structures of Battery Pack 20 and Battery Pack Mounting Portion 30)

Figure 4:
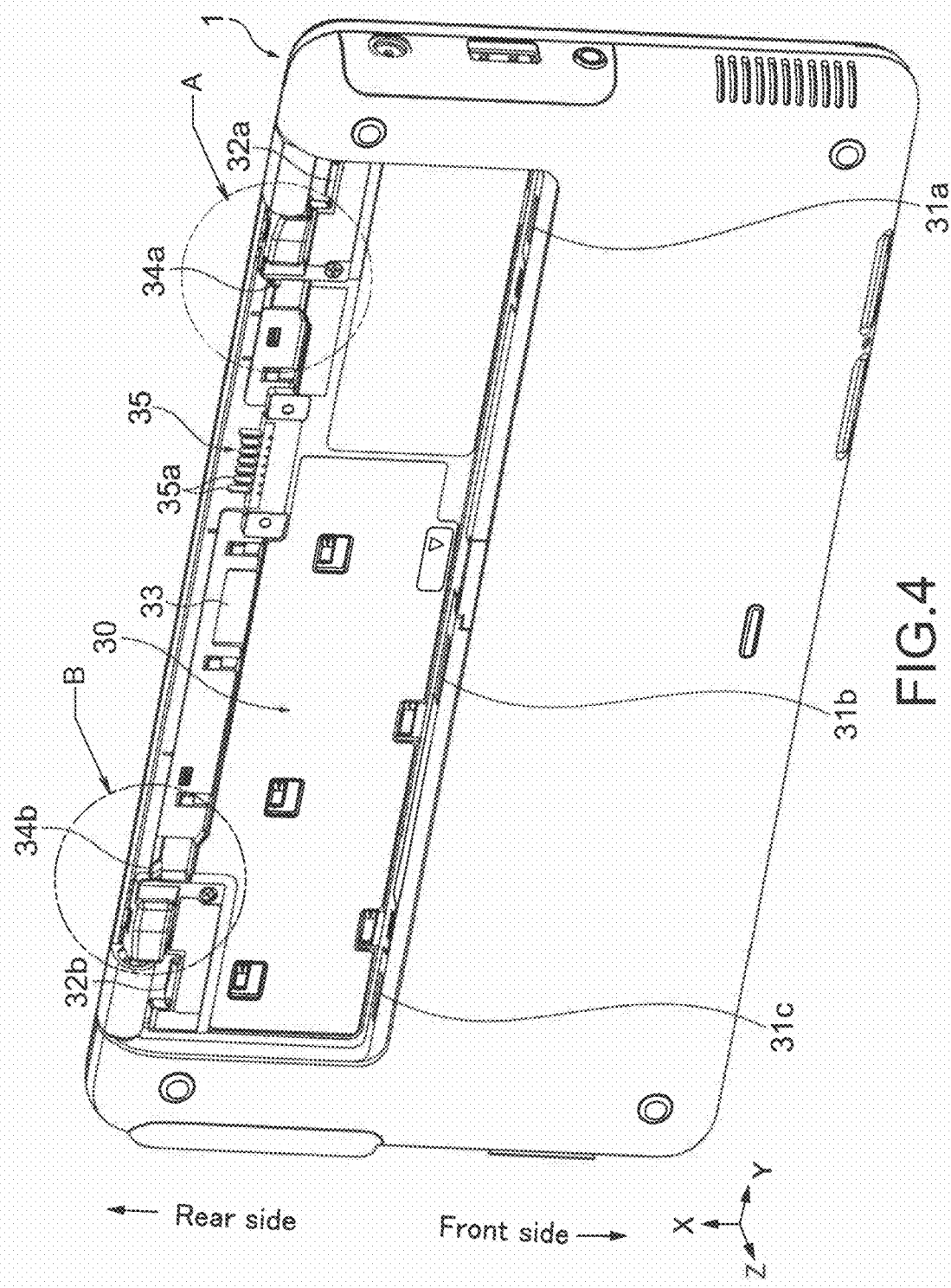
FIG. 4 is a perspective view for explaining a structure of a battery pack mounting portion of the electronic apparatus shown in FIG. 1.
Figure 5:
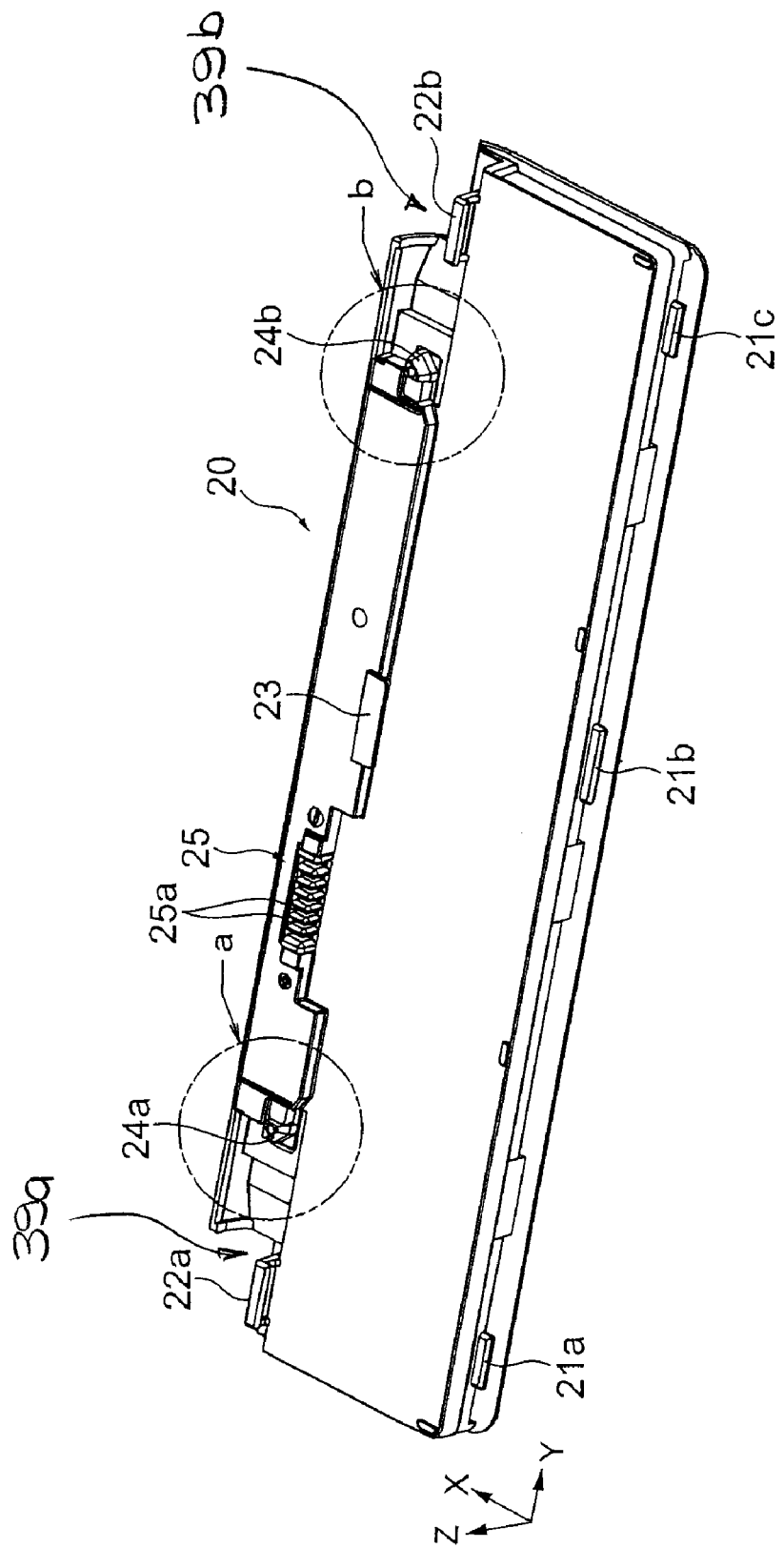
FIG. 5 is a perspective view for explaining a structure of a surface of the battery pack shown in FIG. 3, the surface being mounted to the battery pack mounting portion.
Figure 6:
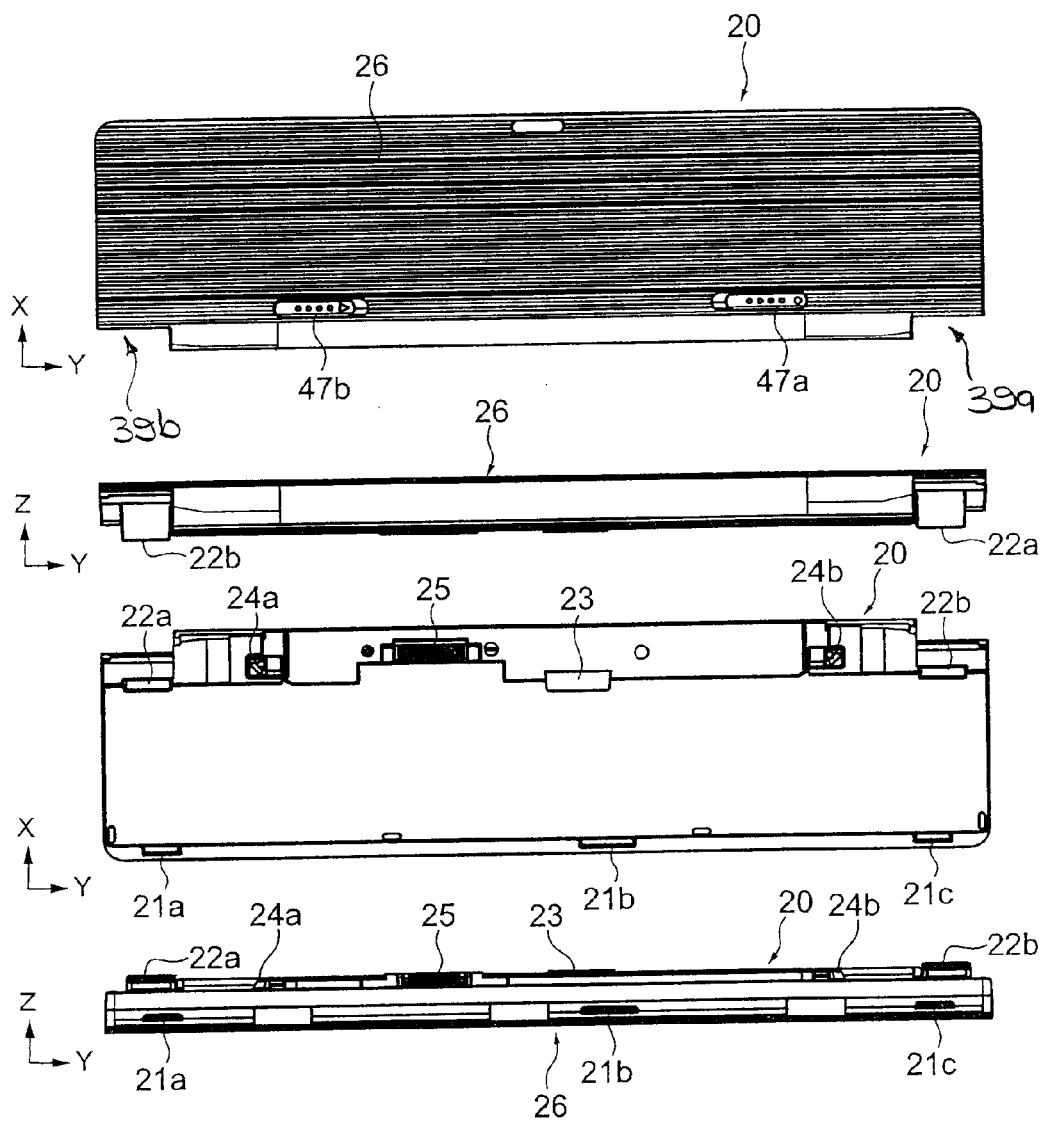
FIG. 6 are side views of the battery pack shown in FIG. 5 viewed in total four directions of an X-axis direction and a Z-axis direction.

FIG. 4 is a perspective view for explaining a structure of the battery pack mounting portion 30 of the electronic apparatus 1. FIG. 5 is a perspective view for explaining a structure of a mount surface of the battery pack 20 that is mounted to the battery pack mounting portion 30. FIG. 6 are side views of the battery pack 20 seen from total four directions of X-axis and Z-axis directions. FIGS. 7A and 7B are a side view of the battery pack 20 seen from a Y-axis direction and a partially-enlarged view thereof.

As shown in FIG. 4, the battery pack mounting portion 30 is provided with, as portions engaged with the battery pack 20, three engagement holes 31a, 31b, and 31c as a first engagement portion, two latch hooks 32a and 32b, an engagement concave portion 33, and two movable portion interference pieces 34a and 34b as a movable portion interference portion. On the other hand, as shown in FIGS. 5 to 7, the battery pack 20 is provided with, as portions engaged with the battery pack mounting portion 30, three engagement protrusions 21a, 21b, and 21c as a second engagement portion, two latches 22a and 22b, an engagement convex portion 23, and two movable portions 24a and 24b.

The three engagement holes 31a, 31b, and 31c are provided away from one another in the Y-axis direction on an inner wall of the battery pack mounting portion 30 on the front side. The three engagement protrusions 21a, 21b, and 21c that are provided on an outer wall of the battery pack 20 on the front side are respectively fit into the engagement holes 31a, 31b, and 31c from the X-axis direction, thus being engaged with one another. It should be noted that the intermediated engagement hole 31b out of the three engagement holes 31a, 31b, and 31c of the battery pack mounting portion 30 is provided at a position deviated from the center portion between the two engagement holes 31a and 31c on both sides in the Y-axis direction. The same holds true for a position of the intermediate engagement protrusion 21b out of the three engagement protrusions 21a, 21b, and 21c of the battery pack 20. With this structure, it is prevented that the battery pack 20 is mistakenly mounted to the battery pack mounting portion 30 inside out.

In a portion of the battery pack mounting portion 30 on the rear side, the two latch hooks 32a and 32b, the engagement concave portion 33, and the two movable portion interference pieces 34a and 34b are provided. The two latch hooks 32a and 32b are provided on both end portions in the Y-axis direction. Those latch hooks 32a and 32b respectively locks the latches 22a and 22b that are provided in a portion of the battery pack 20 on the rear side, thus being engaged with one another. The engagement concave portion 33 is provided at substantially the center portion between the two latch hooks 32a and 32b in the Y-axis direction. The engagement convex portion 23 of the battery pack 20 is fit into the engagement concave portion 33, thus being engaged with each other.

Further, as shown in FIG. 4, provided in a portion of the battery pack mounting portion 30 on the rear side is a male connector portion 35 that is a portion electrically connected with the battery pack 20. The male connector portion 35 includes a plurality of plate-like connector pins 35a. The plurality of connector pins 35a are arranged at predetermined intervals. On the other hand, as shown in FIG. 5, a female connector portion 25 is provided to the battery pack 20, the female connector portion 25 being a portion electrically connected with the main body portion 3 of the electronic apparatus 1. The female connector portion 25 includes a plurality of pin insertion portions 25a into which the individual connector pins 35a of the male connector portion 35 can be inserted from a direction along a plane formed by the Z axis and the X axis. The individual pin insertion portions 25a are provided with electrodes that can contact with the connector pins 35a on the plane formed by the Z axis and the X axis. With this structure, when the battery pack 20 is mounted to the battery pack mounting portion 30 along a predetermined trajectory within the plane formed by the Z axis and the X axis, the male connector portion 35 of the battery pack mounting portion 30 and the female connector portion 25 of the battery pack 20 are smoothly coupled.

Moreover, as shown in FIG. 4, in a portion of the battery pack mounting portion 30 on the rear side, the hinges 4, 4 that support the display portion 2 in an openable manner with respect to the main body portion 3 are provided.

(Exterior of Battery Pack 20)

As shown in FIGS. 2, 3, 6, and 7, when the battery pack 20 is mounted to the battery pack mounting portion 30, a uniform pattern (texture) 26 by asperities is provided on substantially the entire exterior surface of the battery pack 20 that is exposed on the back surface of the electronic apparatus 1. The uniform pattern 26 by asperities has a function as a slip stopper when a user grasps the electronic apparatus 1. In addition, there can be obtained an effect that variations in designs can be increased by selection of the pattern 26. As to the asperities of the pattern 26, a depth and a pitch of the asperities are suitably selected with the emphasis on the function as a slip stopper. FIG. 7B is an enlarged view of a part of FIG. 7A ("c" portion). In the example of FIGS. 7A and 7B, there are used asperities whose edges are rounded so that a surface of a finger are not irritated too strong. Moreover, since the direction in which the battery pack 20 is detached from the battery pack mounting portion 30 is mainly the X-axis direction, a pattern that can efficiently receive a force in the X-axis direction should be employed. More desirably, a pattern in which ridge lines of asperity portions are in line in the Y-axis direction is suitable.

Figure 26:
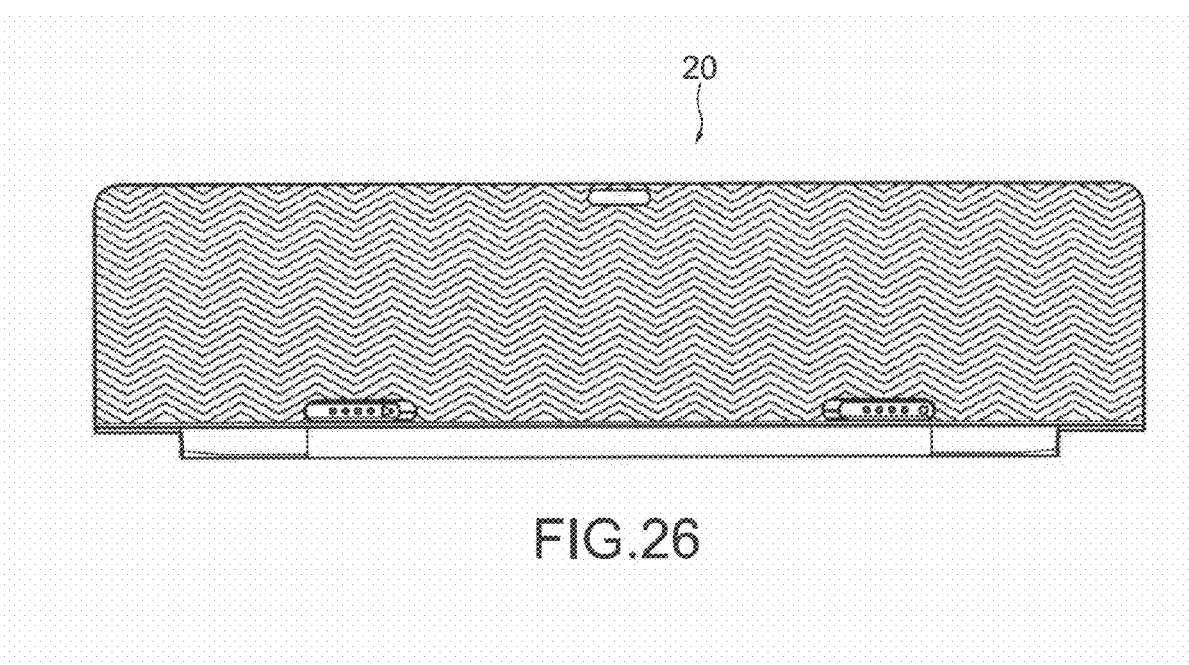
FIG. 26 is a view showing another example of a pattern provided on an exterior surface of the battery pack.
Figure 27:
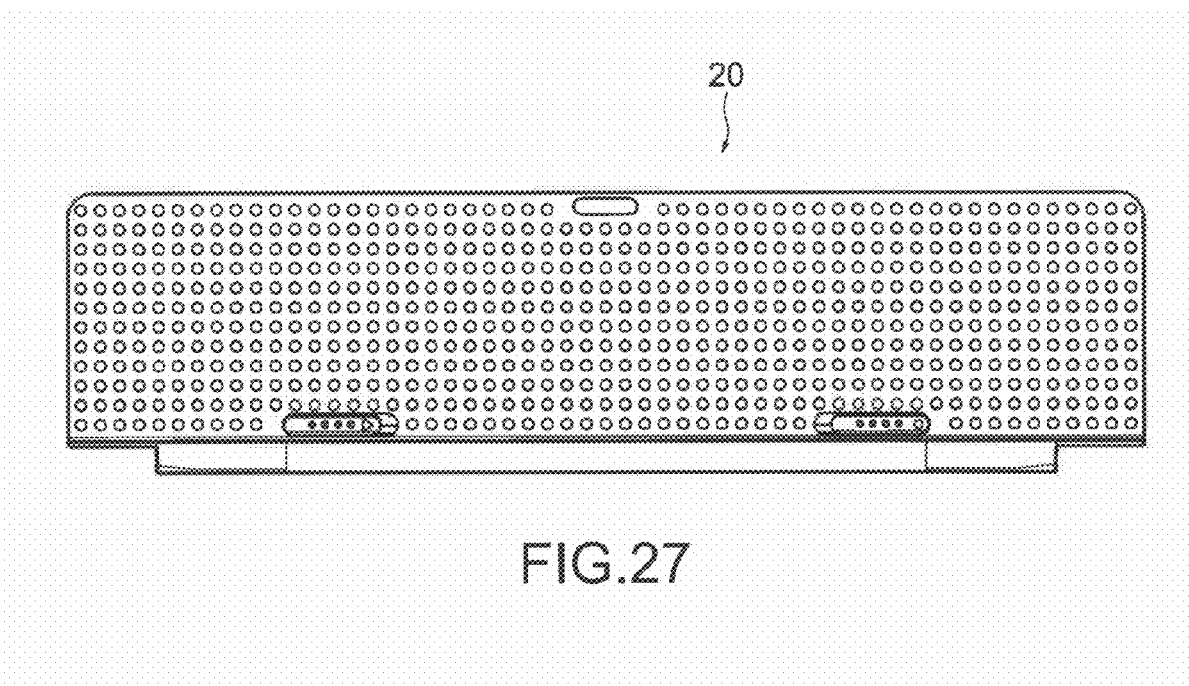
FIG. 27 is a view showing still another example of the pattern provided on the exterior surface of the battery pack.

FIG. 26 is a view showing another example of the pattern 26 provided on the exterior surface of the battery pack 20. In this example, ridge lines of asperities are wavy lines. FIG. 27 is a view showing still another example of the pattern 26 provided on the exterior surface of the battery pack 20. Any pattern other than the linear patterns as shown in FIG. 27 may be used as long as the pattern can receive a force in the X-axis direction. In this example, small circular convex portions are arranged uniformly. Conversely, small circular concave portions may be arranged uniformly. The convex or concave portions may have a shape other than a circle. For example, the shape may be a rectangle or an irregular shape.

Figure 28:
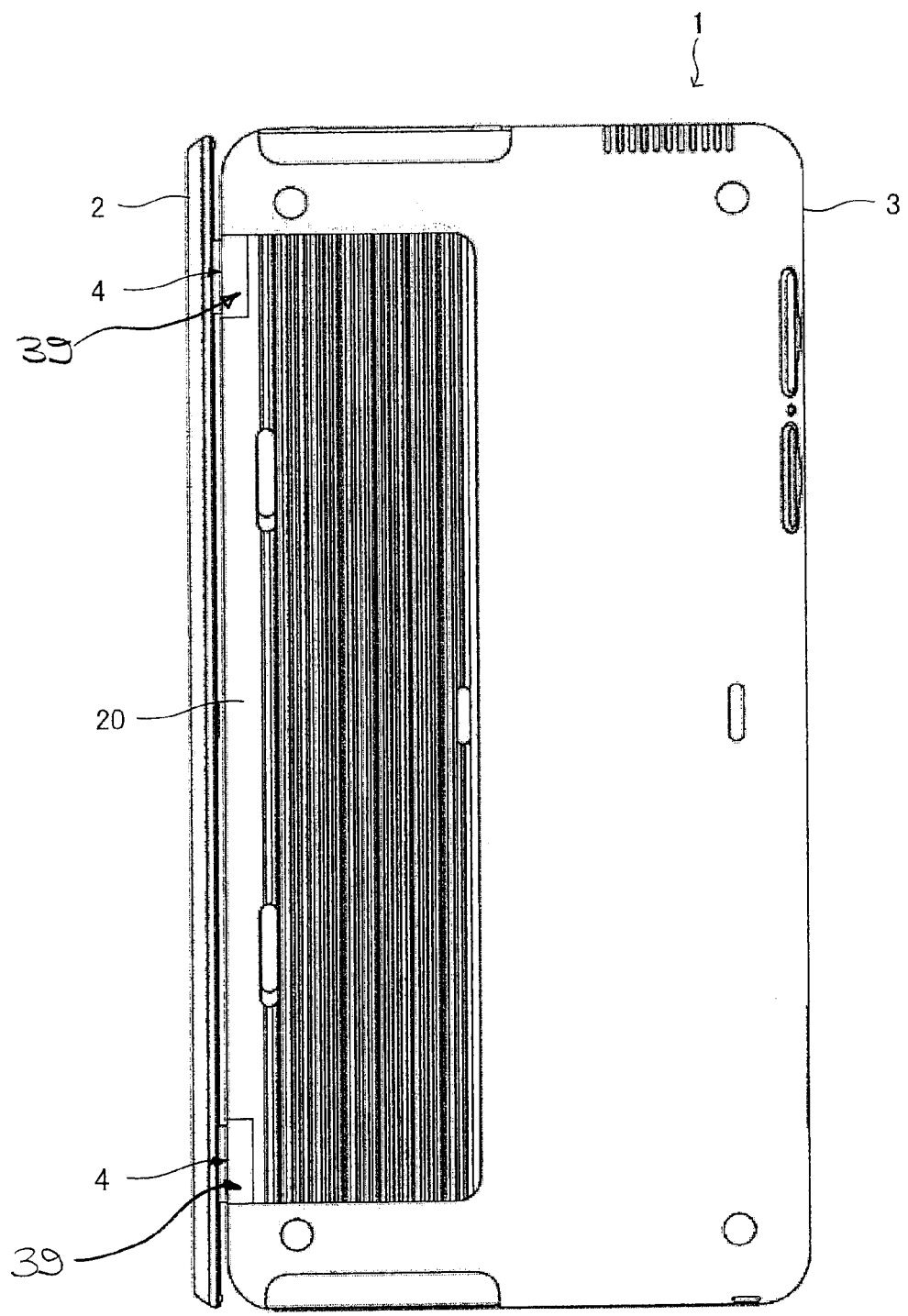
FIG. 28 is a plan view showing a relationship among the display portion, the main body portion, the battery pack, and the hinges from the back surface of the electronic apparatus.

Further, as shown in FIGS. 2, 5, 6, and 28, a pair of notch portions 39a and 39b for avoiding the hinges 4, 4 are provided in a portion of the battery pack 20 on the rear side. FIG. 28 is a plan view showing a relationship among the display portion 2, the main body portion 3, the battery pack 20, and the hinges 4, 4 from the back surface of the electronic apparatus 1. By providing the pair of notch portions 39a and 39b for avoiding the hinges 4, 4 in the portion of the battery pack 20 on the rear side as described above, a structure in which the battery pack 20 can be detached from the battery pack mounting portion 30 provided on the rear side can be realized easily. That is, it becomes unnecessary to secure a space for arranging the hinges 4, 4 in the main body portion 3 of the electronic apparatus 1, with the result that the entire size of the electronic apparatus 1 can be reduced. In addition, a degree of freedom in selection of positions at which the hinges 4, 4 are arranged in the Y-axis direction is increased.

Incidentally, in a case where the pair of notch portions 39a and 39b for avoiding the hinges 4, 4 are provided in the portion of the battery pack 20 on the rear side, it is required that the hinges 4, 4 do not disturb insertion/detachment of the battery pack 20 into/from the battery pack mounting portion 30. In this regard, this electronic apparatus 1 employs a structure in which, when the battery pack 20 is inserted or removed, an attitude of the battery pack 20 is controlled to avoid the hinges 4, 4. This interference structure will be described later.

(Details on Movable Portion Interference Pieces of Battery Pack Mounting Portion and Movable Portions of Battery Pack)

Next, the movable portion interference pieces 34a and 34b of the battery pack mounting portion 30 and the movable portions 24a and 24b of the battery pack 20 will be described in detail.

In the battery pack mounting portion 30 shown in FIG. 4, a peripheral portion of the movable portion interference piece 34a and that of the movable portion interference piece 34b are represented by "A" and "B", respectively. In the battery pack 20 shown in FIG. 5, a peripheral portion of the movable portion 24a corresponding to the movable portion interference piece 34a in the "A" portion is represented by "a", and a peripheral portion of the movable portion 24b corresponding to the movable portion interference piece 34b in the "B" portion is represented by "b".

Figure 8:
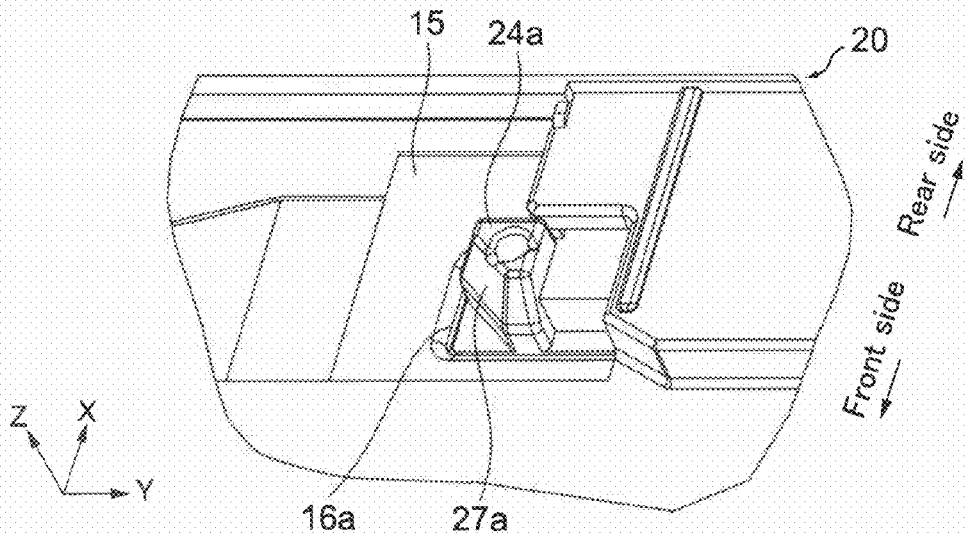
FIG. 8 is a perspective view of an enlarged "a" portion of the battery pack shown in FIG. 5.
Figure 9:
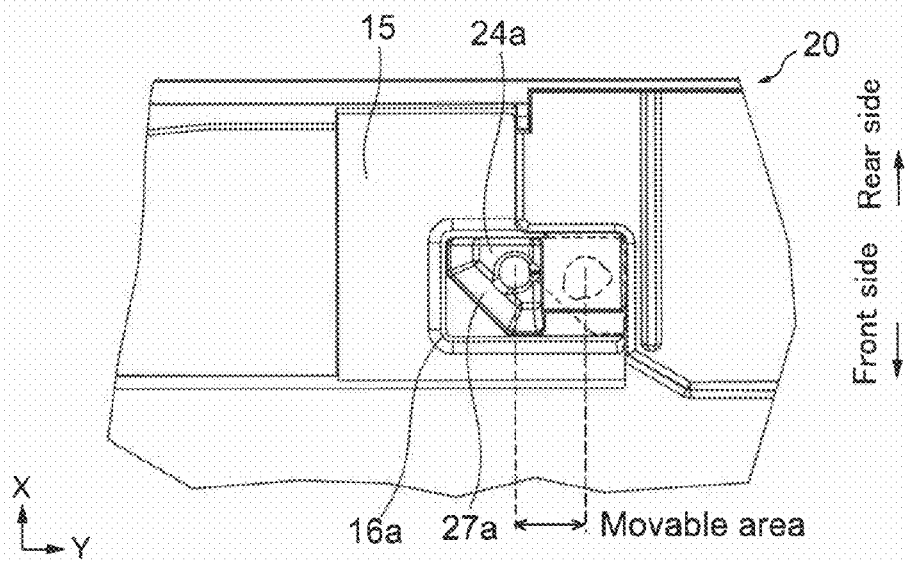
FIG. 9 is a plan view of FIG. 8.
Figure 10:
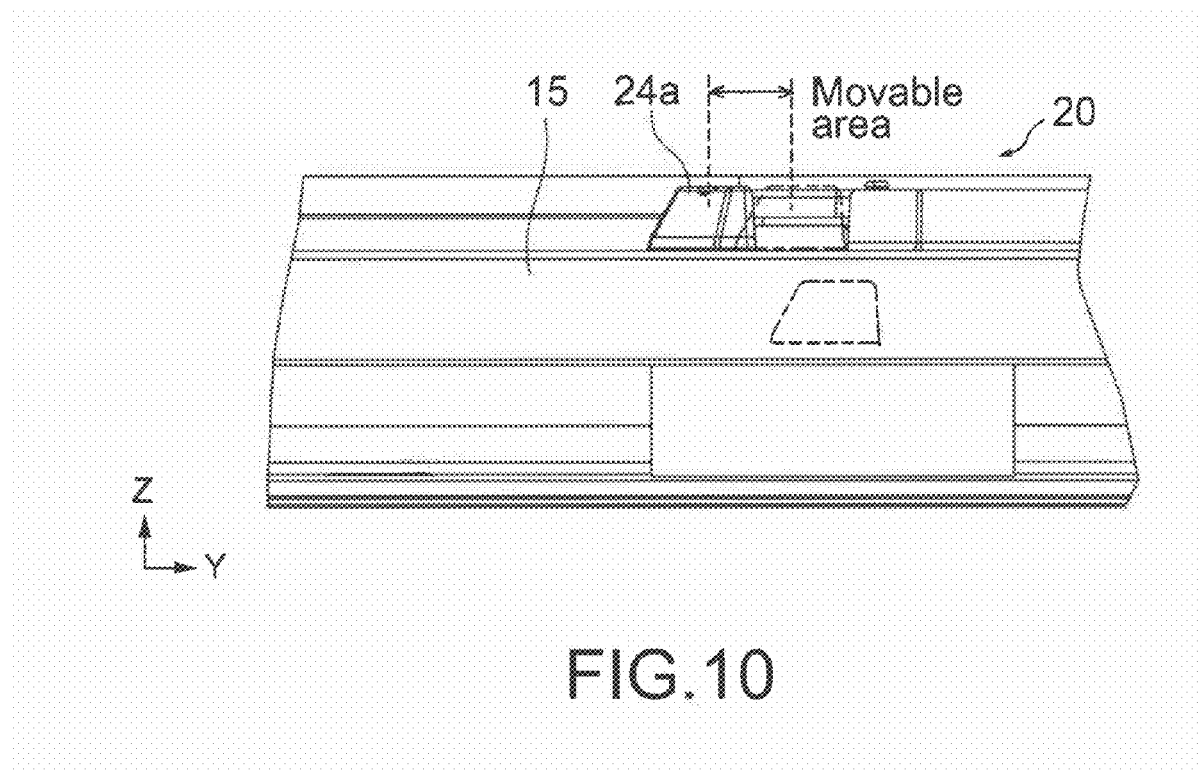
FIG. 10 is a side view of FIG. 8.
Figure 14A:
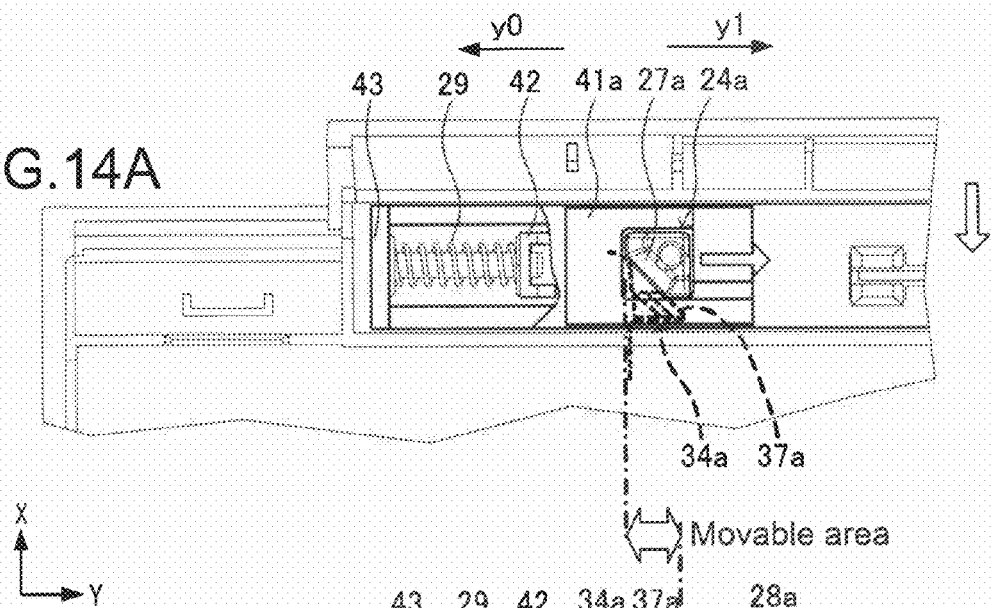
FIGS. 14A to 14C are views showing a relationship between a movable portion in the "a" portion of the battery pack and a movable portion interference piece in an "A" portion of the battery pack mounting portion.
Figure 14B:
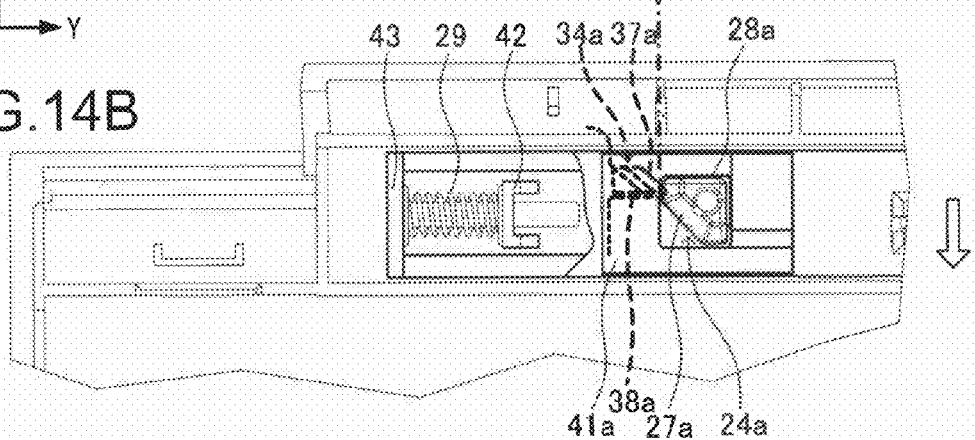
Figure 14C:
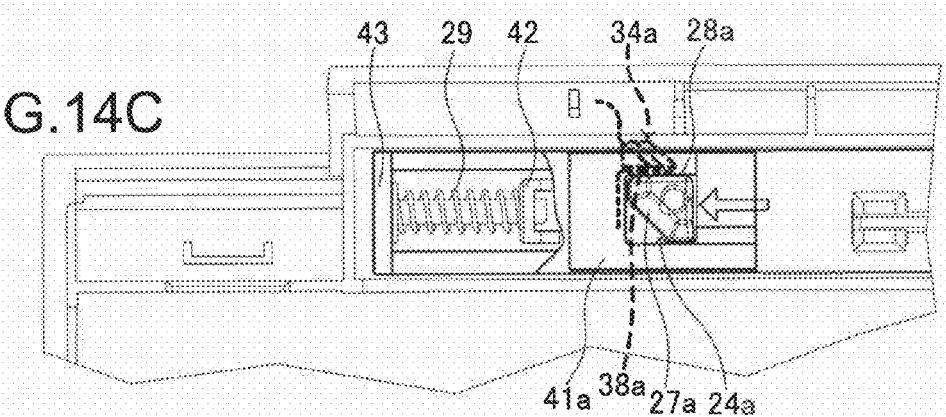

FIG. 8 is a perspective view in which the "a" portion surrounding the movable portion 24a of the battery pack 20 shown in FIG. 5 is enlarged. FIG. 9 is a plan view of FIG. 8. FIG. 10 is a side view of FIG. 8. As shown in those figures, the movable portion 24a in the "a" portion includes a tapered surface 27a that is tilted with respect to three reference planes formed by the three X, Y, and Z axes on the front side of the electronic apparatus 1. The movable portion 24a in the "a" portion has a predetermined movable area in the Y-axis direction with respect to a casing 15 of the battery pack 20. In this movable area, a length in the Y-axis direction is restricted by an opening 16a provided to the casing 15 so that the movable portion 24a in the "a" portion protrudes in the Z-axis direction. As shown in FIGS. 14A to 14C, the movable portion 24a in the "a" portion is biased in a y0 direction in the figures by an elastic means such as a compression spring 29. That is, the movable portion 24a in the "a" portion is provided on a movable portion base 41a that supports the movable portion 24a, and the whole movable portion base 41a can move in the movable area in the Y-axis direction. Provided to the movable portion base 41a is a movable spring reception portion 43 that receives an end of the compression spring 29 whose other end is fixed to a fixed spring reception portion 42 that is provided to the casing 15 of the battery pack 20. With this structure, the movable portion 24a in the "a" portion is constantly biased in the y0 direction.

Figure 11:
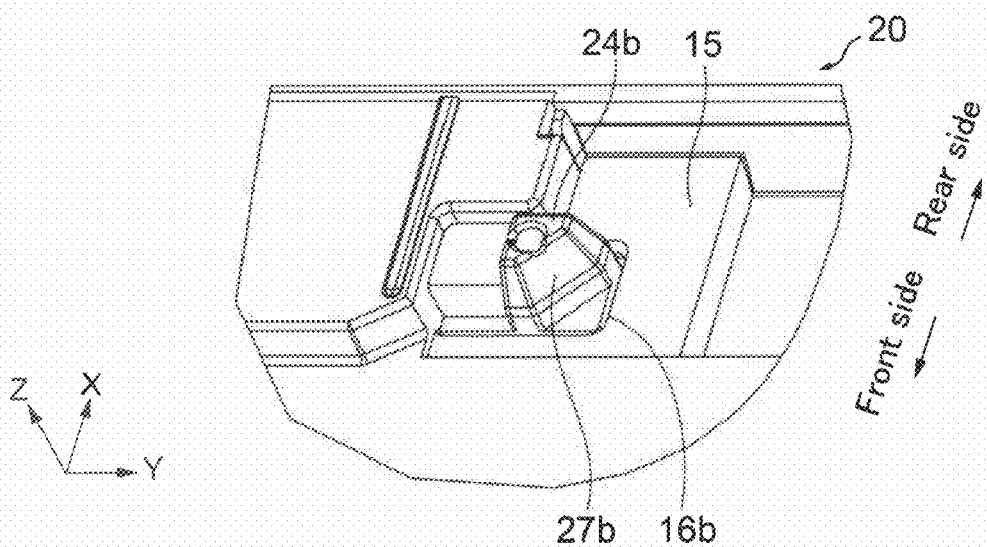
FIG. 11 is a perspective view of an enlarged "b" portion of the battery pack shown in FIG. 5.
Figure 12:
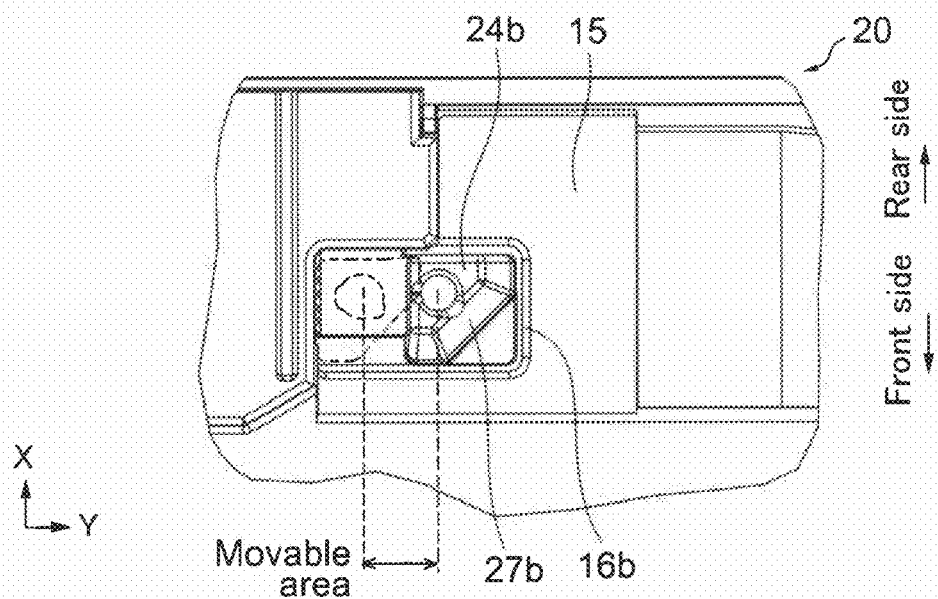
FIG. 12 is a plan view of FIG. 11.
Figure 13:
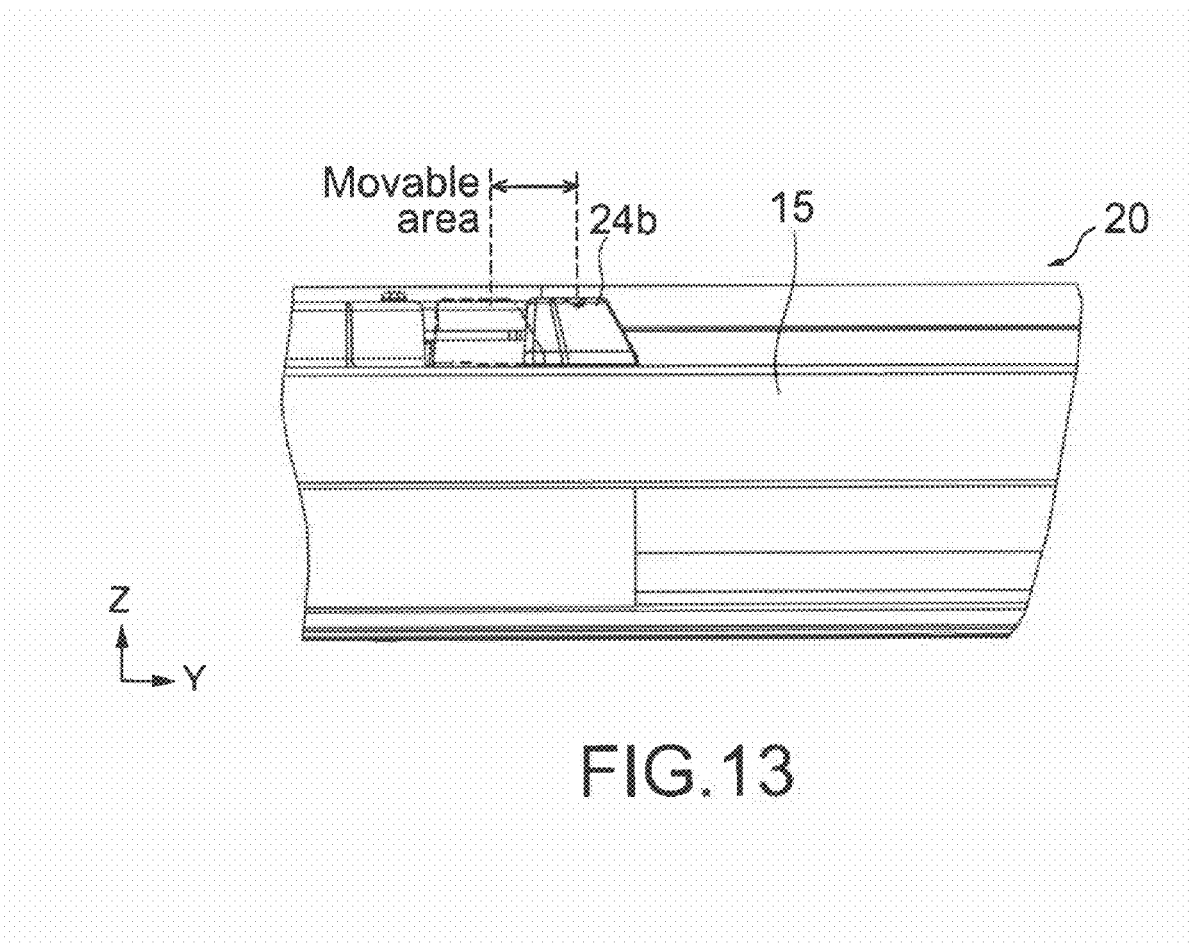
FIG. 13 is a side view of FIG. 11.

FIG. 11 is a perspective view in which the "b" portion surrounding the movable portion 24b of the battery pack 20 shown in FIG. 5 is enlarged. FIG. 12 is a plan view of FIG. 11. FIG. 13 is a side view of FIG. 11. As shown in those figures, the movable portion 24b in the "b" portion also includes a tapered surface 27b that is tilted with respect to the three reference planes formed by the three X, Y, and Z axes on the front side of the electronic apparatus 1 as in the case of the movable portion 24a in the "a" portion. The movable portion 24b in the "b" portion has a predetermined movable area in the Y-axis direction with respect to the casing 15 of the battery pack 20 as in the case of the movable portion 24a in the "a" portion. In this movable area, a length in the Y-axis direction is restricted by an opening 16b provided to the casing 15 so that the movable portion 24b in the "b" portion protrudes in the Z-axis direction. As shown in FIGS. 15A to 15D, the movable portion 24b in the "b" portion is provided on a movable portion base 41b that supports the movable portion 24b, and the whole movable portion base 41b can move in the movable area in the Y-axis direction. The movable portion base 41b is provided with a latch 44. The latch 44 is provided with a convex portion 46 that is engaged with a V-shaped notch 45 fixed to the casing 15 of the battery pack 20.

As shown in FIG. 15A, when the movable portion 24b in the "b" portion is positioned at an end of the movable area in a y1 direction, the convex portion 46 of the latch 44 causes interference with a tilted surface of the V-shaped notch 45 on the y1 direction side and thus a movement of the movable portion 24b in the "b" portion toward the y0 direction is restricted. Accordingly, the movable portion 24b in the "b" portion is constrained at the end position of the movable area in the y1 direction at this time.

As shown in FIG. 15B, when the movable portion 24b in the "b" portion is positioned at an end of the movable area in the y0 direction, the convex portion 46 of the latch 44 causes interference with a tilted surface of the V-shaped notch 45 on the y0 direction side and thus the movement of the movable portion 24b in the "b" portion toward the y1 direction is restricted. Accordingly, the movable portion 24b in the "b" portion is constrained at the end position of the movable area in the y0 direction at this time.

Next, the two movable portion interference pieces 34a and 34b of the battery pack mounting portion 30 will be described in detail. Those movable portion interference pieces 34a and 34b interfere with the movable portions 24a and 24b when the battery pack 20 is mounted to the battery pack mounting portion 30.

Figure 16:
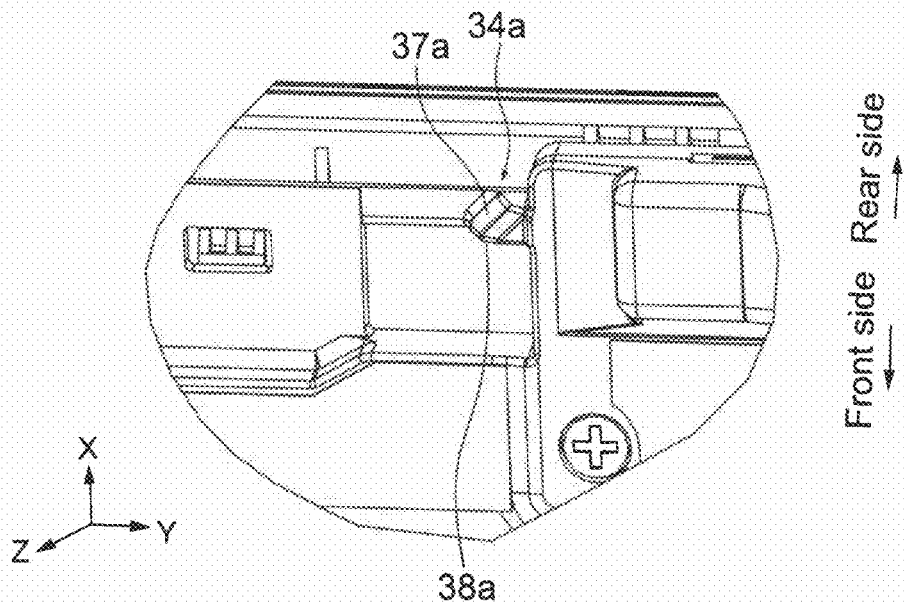
FIG. 16 is a perspective view of the enlarged "A" portion of the battery pack mounting portion shown in FIG. 4.
Figure 17:
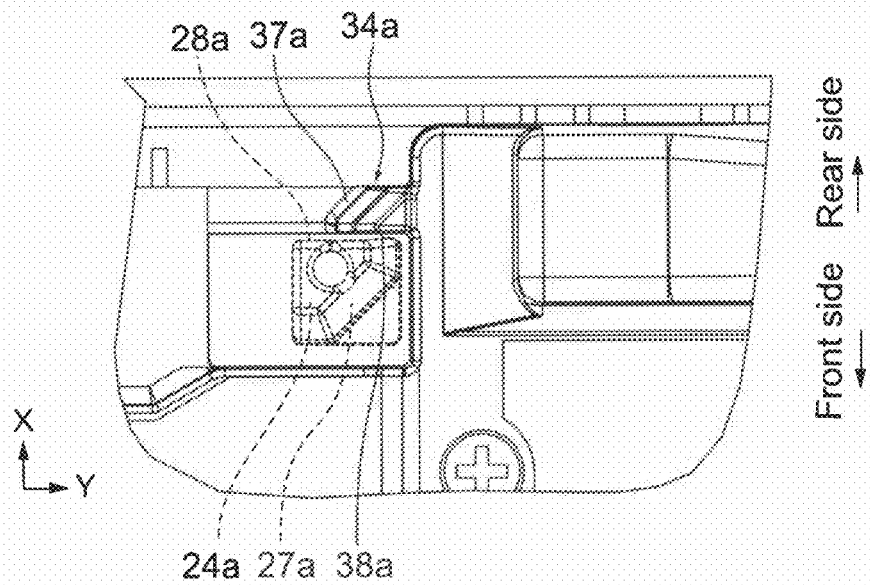
FIG. 17 is a plan view of FIG. 16.
Figure 18:
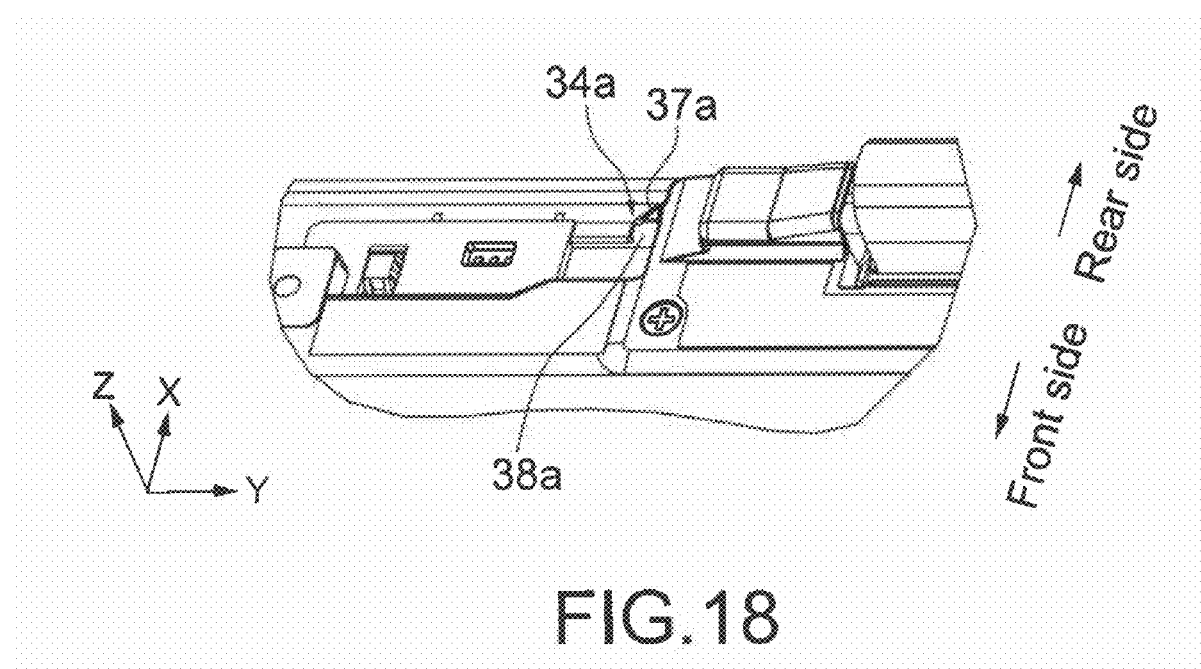
FIG. 18 is a perspective view of FIG. 16 viewed from another angle.

FIG. 16 is a perspective view in which the "A" portion surrounding the movable portion interference piece 34a of the battery pack mounting portion 30 shown in FIG. 4 is enlarged. FIG. 17 is a plan view of FIG. 16. FIG. 18 is a perspective view of FIG. 16 seen from another angle. The movable portion interference piece 34a in the "A" portion includes a tapered surface 37a that, when the battery pack 20 is mounted to the battery pack mounting portion 30, abuts on the tapered surface 27a of the movable portion 24a in the "a" portion of the battery pack 20 and moves the movable portion 24a in the y1 direction within the movable area in the Y-axis direction against a bias force of the compression spring 29. That is, as shown in FIGS. 14A and 143, when the battery pack 20 is mounted to the battery pack mounting portion 30, the tapered surface 37a of the movable portion interference piece 34a in the "A" portion abuts on the tapered surface 27a of the movable portion 24a in the "a" portion of the battery pack 20 and presses it. Owing to an action caused by those tapered surfaces 27a and 37a, the movable portion 24a in the "a" portion is moved in the y1 direction within the movable area in the Y-axis direction against the bias force of the compression spring 29. The tapered surface 37a of the movable portion interference piece 34a in the "A" portion is a tapered surface that is tilted with respect to the three reference planes formed by the three X, Y, and Z axes.

Further, referring back to FIGS. 16 to 18, the movable portion interference piece 34a in the "A" portion has a flat surface 38a along a reference surface formed by the Z axis and the Y axis at an end on the front side. As shown in FIGS. 14C and 17, the flat surface 38a serves as a portion that presses, from the rear side, a side surface 28a of the movable portion 24a in the "a" portion of the battery pack 20 mounted to the battery pack mounting portion 30. That is, FIG. 14B shows a state in which the movable portion 24a in the "a" portion reaches the end position in the y1 direction within the movable area in the Y-axis direction by a pressing force from the tapered surface 37a of the movable portion interference piece 34a in the "A" portion. When the battery pack 20 is pushed into the battery pack mounting portion 30 more deeply from that state, the movable portion 24a in the "a" portion is released from the interference of the movable portion interference piece 34a in the "A" portion and moved from the end position in the y1 direction within the movable area in the Y-axis direction to the opposite end position in the y0 direction by the bias force of the compression spring 29. FIG. 14C shows a state immediately thereafter. As described above, the side surface 28a of the movable portion 24a in the "a" portion of the battery pack 20 mounted to the battery pack mounting portion 30 is pressed from the rear side of the electronic apparatus 1 by the flat surface 38a of the movable portion interference piece 34a in the "A" portion and thus there is obtained a state in which the movement of the movable portion 24a in the "a" portion toward the rear side of the electronic apparatus 1 is restricted.

Figure 19:
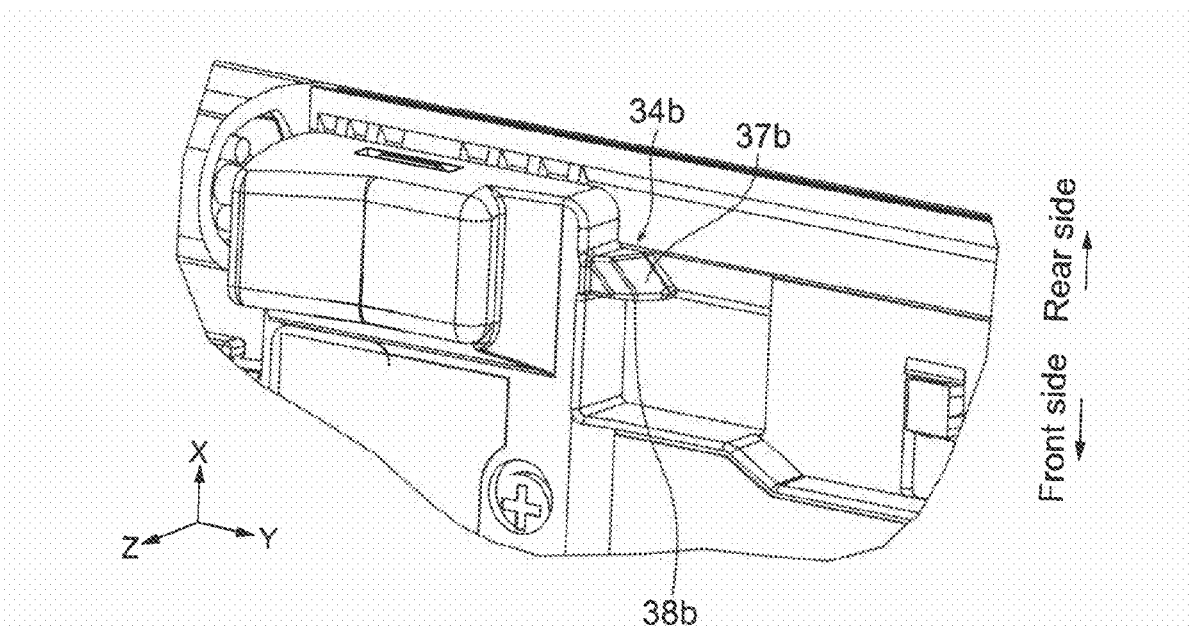
FIG. 19 is a perspective view of the enlarged "B" portion of the battery pack mounting portion shown in FIG. 4.
Figure 20:
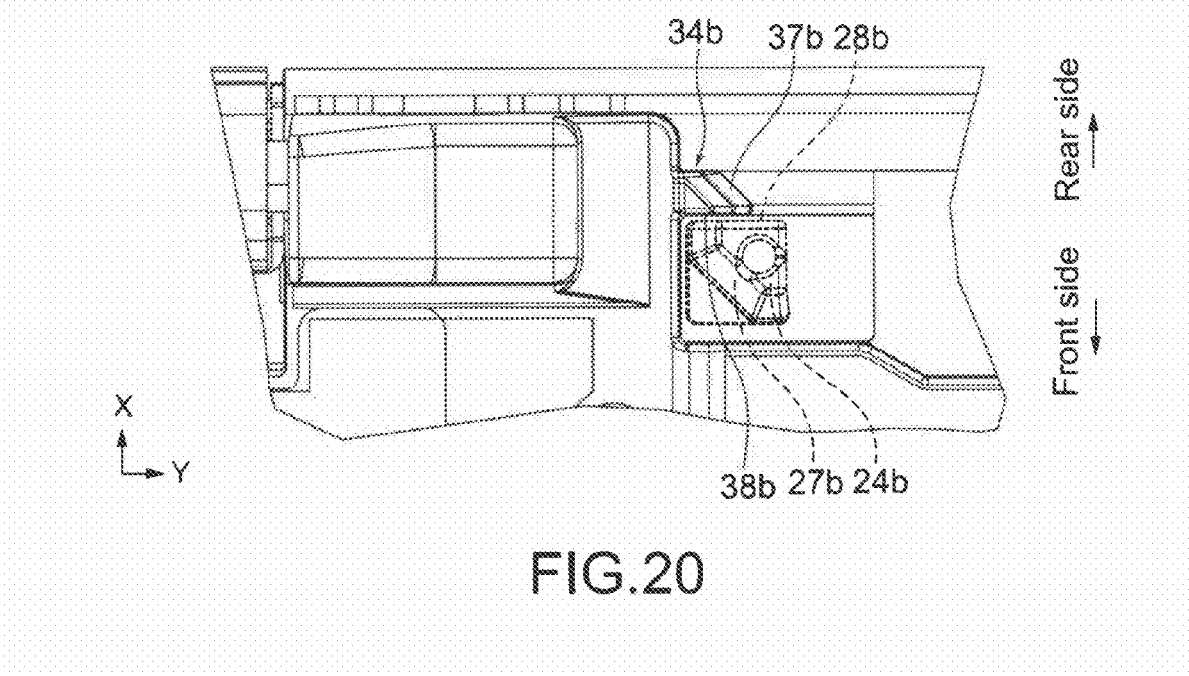
FIG. 20 is a plan view of FIG. 19.
Figure 21:
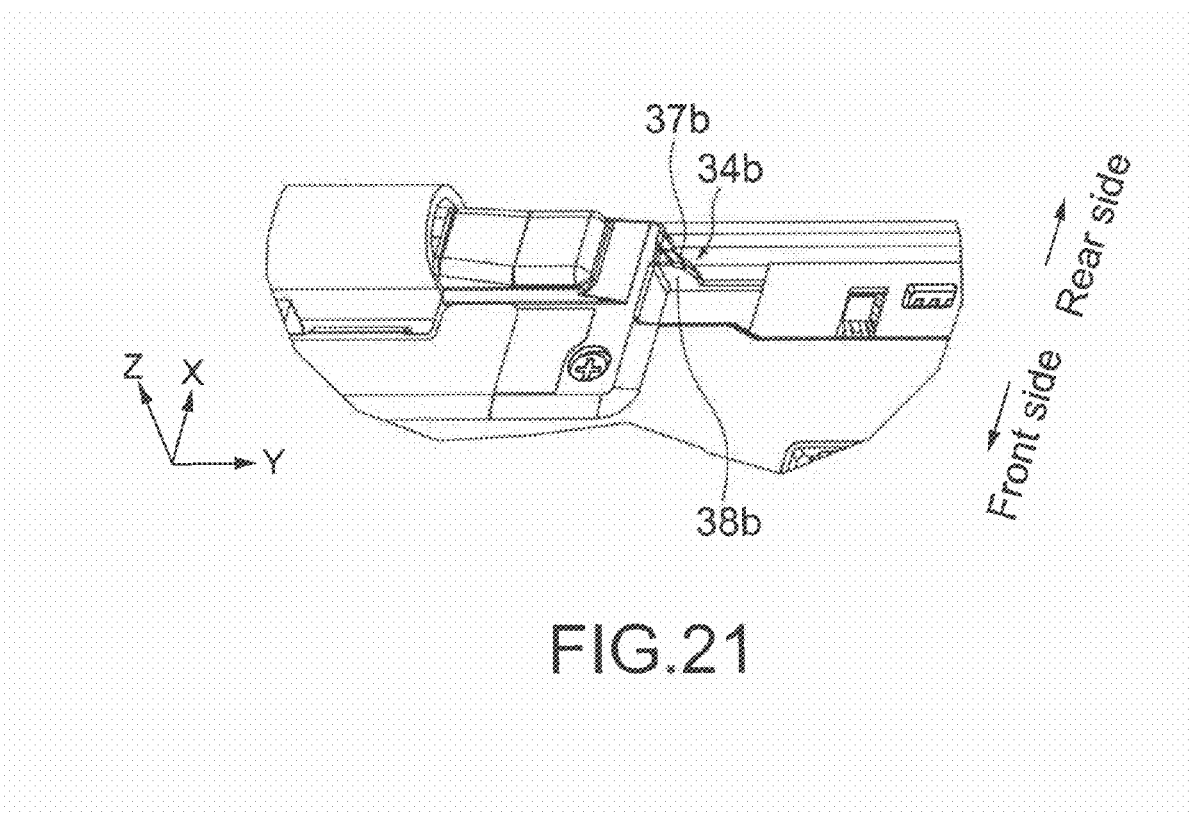
FIG. 21 is a perspective view of FIG. 19 viewed from another angle.

FIG. 19 is a perspective view in which the "B" portion surrounding the movable portion interference piece 34b of the battery pack mounting portion 30 shown in FIG. 4 is enlarged. FIG. 20 is a plan view of FIG. 19. FIG. 21 is a perspective view of FIG. 19 seen from another angle. The structure of the movable portion interference piece 34b in the "B" portion is similar to that of the movable portion interference piece 34a in the "A" portion. The movable portion interference piece 34b in the "B" portion includes a tapered surface 37b that, when the battery pack 20 is mounted to the battery pack mounting portion 30, abuts on the tapered surface 27b of the movable portion 24b in the "b" portion of the battery pack 20 and moves the movable portion 24b in the y1 direction within the movable area in the Y-axis direction. That is, as shown in FIGS. 15A and 15B, when the battery pack 20 is mounted to the battery pack mounting portion 30, the tapered surface 37b of the movable portion interference piece 34b in the "B" portion presses the tapered surface 27b of the movable portion 24b in the "b" portion of the battery pack 20. Owing to an action caused by those tapered surfaces 37b and 27b, the movable portion 24b in the "b" portion is moved in the y0 direction within the movable area in the Y-axis direction against a resistance caused by the engagement between the tilted surface of the V-shaped notch 45 on the y1 direction side and the convex portion 46 of the latch 44. The tapered surface 37b of the movable portion interference piece 34b in the "B" portion is a tapered surface that is tilted with respect to the three reference planes formed by the three X, Y, and Z axes as in the case of the tapered surface 37a of the movable portion interference piece 34a in the "A" portion.

Further, referring back to FIGS. 19 to 21, the movable portion interference piece 34b in the "B" portion has a flat surface 38b along a reference surface formed by the Z axis and the Y axis at an end on the front side. As shown in FIGS. 15D and 20, the flat surface 38b serves as a portion that presses, from the rear side, a side surface 28b of the movable portion 24b in the "b" portion of the battery pack 20 mounted to the battery pack mounting portion 30, as in the case of the movable portion interference piece 34a in the "A" portion. That is, FIG. 15B shows a state in which the movable portion 24b in the "b" portion reaches the end position in the y0 direction within the movable area in the Y-axis direction by a pressing force from the tapered surface 37b of the movable portion interference piece 34b in the "B" portion. When the battery pack 20 is pushed into the battery pack mounting portion 30 more deeply from that state, the movable portion 24b in the "b" portion is released from the interference of the movable portion interference piece 34b in the "B" portion and becomes movable in the y1 direction within the movable area in the Y-axis direction as shown in FIG. 15C. The movable portion 24b in the "b" portion is moved within the movable area in the Y-axis direction by a manual operation performed with a slide operation portion 47b that is provided to be exposed on the exterior surface of the battery pack 20 (see FIGS. 2, 6, 22, and 23). Accordingly, when a user moves the movable portion 24b in the "b" portion to the end position in the y1 direction by operating the slide operation portion 47b from the state shown in FIG. 15C, the states enters a state of FIG. 15D. That is, the side surface 28b of the movable portion 24b in the "b" portion of the battery pack 20 is pressed from the rear side by the flat surface 38b of the movable portion interference piece 34b in the "B" portion and thus the movement of the movable portion 24b in the "b" portion toward the rear side is restricted.

As shown in FIG. 22, the movable portion base 41a of the movable portion 24a in the "a" portion of the battery pack 20 and the movable portion base 41b of the movable portion 24b in the "b" portion of the battery pack 20 are respectively provided with a slide operation portion 47a and the slide operation portion 47b in an integrated manner. The slide operation portions 47a and 47b can be caused to slide manually in the Y-axis direction individually. The movable areas of the slide operation portions 47a and 47b in the Y-axis direction are the same as those of the movable portions 24a and 24b in the Y-axis direction.

FIGS. 23A and 23B each show a lock position and a release position of the slide operation portions 47a and 47b. Each of the slide operation portions 47a and 47b is provided with an arrow indicating a lock direction on a surface thereof. Here, the "lock" means a state of FIGS. 14C and 15D, that is, a state in which the side surfaces 28a and 28b of the movable portions 24a and 24b of the battery pack 20 are pressed by the flat surfaces 38a and 38b of the movable portion interference pieces 34a and 34b from the rear side. In the lock state, it is difficult to remove the battery pack 20 from the battery pack mounting portion 30. The "release" means a state of FIGS. 14B, 15B, and 15C, that is, a state in which the movable portions 24a and 24b of the battery pack 20 are released from the interference with the movable portion interference pieces 34a and 34b. In the release state, it is difficult to remove the battery pack 20 from the battery pack mounting portion 30.

(Mounting Operation of Battery Pack 20)

Next, an operation of mounting the battery pack 20 to the battery pack mounting portion 30 will be described.

Figure 24A:
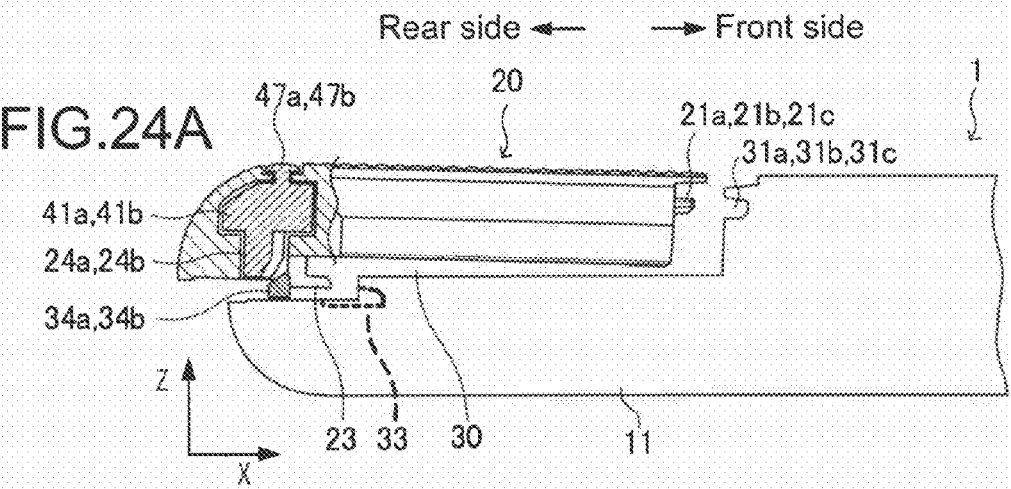
FIGS. 24A to 24C are views showing an operation when the battery pack is mounted to the battery pack mounting portion.
Figure 24B:
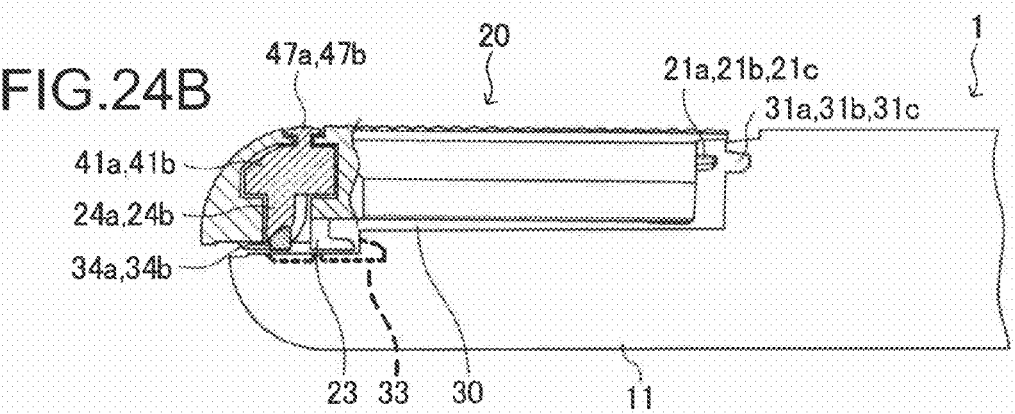
Figure 24C:
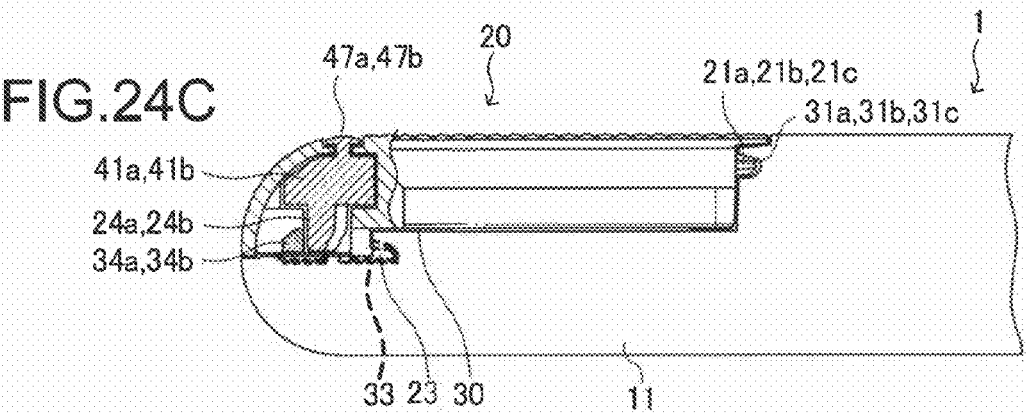

FIGS. 24A to 24C are views showing an operation when the battery pack 20 is mounted to the battery pack mounting portion 30.

First, as shown in FIG. 24A, the battery pack 20 is inserted into the battery pack mounting portion 30 from the rear side such that the three engagement protrusions 21a, 21b, and 21c of the battery pack 20 are aligned with the three engagement holes 31a, 31b, and 31c of the battery pack mounting portion 30. In this case, the insertion attitude of the battery pack 20 with respect to the X axis is restricted to an area in which the respective engagement protrusions 21a, 21b, and 21c of the battery pack 20 can be inserted into the engagement holes 31a, 31b, and 31c of the battery pack mounting portion 30.

FIG. 24B shows a state in which the battery pack 20 is inserted into the battery pack mounting portion 30 to some extent. At this time, the tapered surfaces 27a and 27b of the movable portions 24a and 24b of the battery pack 20 abut on the tapered surfaces 37a and 37b of the movable portion interference pieces 34a and 34b of the battery pack mounting portion 30. This state is the state shown in FIGS. 14A and 15A.

When the battery pack 20 is pushed into the battery pack mounting portion 30 more deeply, the movable portion 24a in the "a" portion is moved to the end in the y1 direction within the movable area against the bias force of the compression spring 29 due to the interference with the movable portion interference piece 34a in the "A" portion of the battery pack mounting portion 30. Simultaneously, due to the interference with the movable portion interference piece 34b in the "B" portion of the battery pack mounting portion 30, the movable portion 24b in the "b" portion is moved to the end in the y0 direction within the movable area against the resistance caused by the engagement between the tilted surface of the V-shaped notch 45 and the convex portion 46 of the latch 44. This state is as shown in FIGS. 14B, 15B, and 15C. Further, the slide operation portions 47a and 47b are moved to the release position shown in FIG. 23B at this time.

When the battery pack 20 is pushed into the battery pack mounting portion 30 until the interference of the movable portions 24a and 24b of the battery pack 20 with the movable portion interference pieces 34a and 34b is canceled, the movable portion 24a in the "a" portion is moved to the end position of the movable area in the y0 direction by the bias force of the compression spring 29. Accordingly, the side surface 28a of the movable portion 24a in the "a" portion is pressed by the flat surface 38a of the movable portion interference piece 34a in the "A" portion from the rear side, with the result that the movement of the movable portion 24a in the "a" portion toward the rear side is restricted.

On the other hand, a positional relationship between the movable portion 24b in the "b" portion and the movable portion interference piece 34b in the "B" portion at that time is in the state shown in FIG. 15C. Here, the slide operation portion 47b corresponding to the movable portion 24b in the "b" portion is manually operated to be moved to the end in the y1 direction against the resistance caused by the engagement between the tilted surface of the V-shaped notch 45 and the convex portion 46 of the latch 44. FIG. 15D shows the state in which the slide operation portion 47b is moved to the end in the y1 direction. At this time, the side surface 28b of the movable portion 24b in the "b" portion of the battery pack 20 is pressed by the flat surface 38b of the movable portion interference piece 34b in the "B" portion from the rear side, with the result that the movement of the movable portion 24b in the "b" portion toward the rear side is restricted. Accordingly, the battery pack 20 is brought to the lock state in which the movement towards the rear side is restricted at two points away from each other in the Y-axis direction. Moreover, in this case, the three engagement holes 31a, 31b, and 31c, the two latch hooks 32a and 32b, and the engagement concave portion 33 of the battery pack mounting portion 30 are engaged with the three engagement protrusions 21a, 21b, and 21c, the two latches 22a and 22b, and the engagement convex portion 23 of the battery pack 20, respectively. In other words, the mounting of the battery pack 20 to the battery pack mounting portion 30 is completed.

On the other hand, in the course of the mounting of the battery pack 20 to the battery pack mounting portion 30 as described above, the male connector portion 35 provided in the portion of the battery pack mounting portion 30 on the rear side and the female connector portion 25 provided to the battery pack 20 are connected to each other.

Figure 25A:
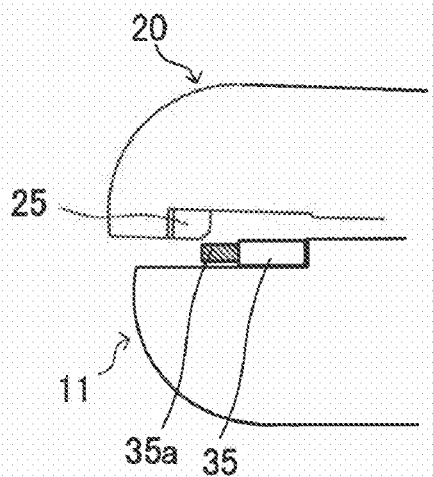
FIGS. 25A to 25C are views showing a state of connection between a male connector portion of the battery pack mounting portion and a female connector portion of the battery pack.
Figure 25B:
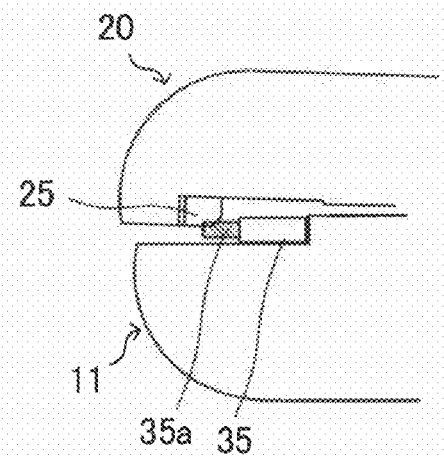
Figure 25C:
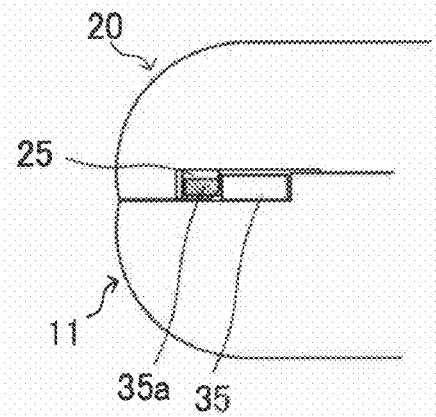

FIGS. 25A to 25C are views showing a state of connection between the male connector portion 35 and the female connector portion 25. Here, FIGS. 25A, 25B, and 25C are respectively correspond to FIGS. 24A, 24B, and 24C in terms of timing. As shown in the figures, in the course of the mounting of the battery pack 20 to the battery pack mounting portion 30, the individual connector pins 35a of the male connector portion 35 provided to the battery pack mounting portion 30 are inserted into the pin insertion portions 25a of the female connector portion 25 provided to the battery pack 20, with the result that the male connector portion 35 and the female connector portion 25 are connected to each other.

Moreover, in the electronic apparatus 1, at a time when the battery pack 20 is mounted to the battery pack mounting portion 30, the battery pack 20 is loaded with a front side thereof being tilted more downwardly than a rear side thereof up to a time immediately before the mounting is completed. Therefore, the interference of the battery pack 20 with the hinges 4, 4 can be avoided.

In a case where the battery pack 20 is detached from the battery pack mounting portion 30, the two slide operation portions 47a and 47b are simultaneously caused to slide manually to the limits thereof within the movable area in a direction opposite to the arrow indicating the lock direction, as shown in FIG. 23B. Accordingly, the movable portion interference pieces 34a and 34b that are pressing the side surfaces 28a and 28b of the movable portions 24a and 24b of the battery pack 20 from the rear side are retreated in the Y-axis direction and thus it becomes possible to take out the battery pack 20 to the rear side.

As described above, in the electronic apparatus 1 according to this embodiment, a tolerance range of variations in the insertion attitude of the battery pack 20 becomes greater. For example, in a structure in which guides along an insertion direction are provided on both side surfaces of a battery pack mounting portion and a battery pack in a width direction, an insertion attitude of the battery pack is restricted from an early stage at which the battery pack is inserted into the battery pack mounting portion. In contrast to this, according to this embodiment, the restriction of the attitude of the battery pack 20 is relieved at least at the early stage because the guides along the insertion direction are unnecessary. In addition, downsizing is made easier because the guides along the insertion direction are unnecessary.

Moreover, in the electronic apparatus 1 according to this embodiment, the surfaces on which the movable portions 24a and 24b of the battery pack 20 and the movable portion interference pieces 34a and 34b of the battery pack mounting portion 30 interfere with each other are the tapered surfaces that are tilted with respect to the three reference planes formed by the three X, Y, and Z axes. With this structure, a tolerance range of variations of the battery pack 20 in a height position as the Z-axis direction, the battery pack 20 being inserted into the battery pack mounting portion 30, can be largely secured. Accordingly, the detachment of the battery pack 20 can be carried out easier.

It should be noted that the present invention is not limited to the embodiment described above and various modifications can be made within the technical idea of the present invention.

The present application contains subject matter related to that disclosed in Japanese Priority Patent Application JP 2008-335341 filed in the Japan Patent Office on Dec. 26, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic apparatus, comprising:
    a main body that includes a battery pack mounting portion disposed at a first end portion of the main body in a first coordinate axis direction toward a rear side of the main body;
    a display portion that is provided to be openable with respect to the main body via a hinge portion provided at the first end portion in the first coordinate axis direction;
    a battery pack that is detachable from the battery pack mounting portion along the first coordinate axis direction;
    a first connector portion that is provided at a position of the battery pack mounting portion on the first end portion side in the first coordinate axis direction;
    a second connector portion that is provided to the battery pack and connectable to the first connector portion;
    a first engagement portion that is provided at a second end portion of the battery pack mounting portion, the second end portion disposed opposite the first end portion in the first coordinate axis direction;
    a second engagement portion that is provided to the battery pack and capable of being engaged with the first engagement portion by being fit into the first engagement portion relatively in the first coordinate axis direction; and
    a notch portion to avoid the hinge portion, the notch portion disposed at a first end portion of the battery pack, the first end portion of the battery pack corresponding in location to the first end portion of the main body in the first coordinate axis direction.

2. The electronic apparatus according to claim 1, further comprising:
    a first movable portion that is provided at a position of the battery pack on the first end portion side in the first coordinate axis direction to be movable in a second coordinate axis direction perpendicular to the first coordinate axis direction;
    a first movable portion interference portion that is provided to the battery pack mounting portion, and interferes with the first movable portion and temporality retreats the first movable portion in the second coordinate axis direction from a first position in which a detachment of the battery pack from the battery pack mounting portion is restricted, to a second position in which the detachment is allowed when the battery pack is mounted; and
    a bias portion to bias the first movable portion in a direction opposite to the retreat direction by the interference with the first movable portion interference portion, wherein the second coordinate axis direction is substantially parallel to a display screen of the display portion when the display portion is in a closed position against the main body.

3. The electronic apparatus according to claim 2, wherein each of the first movable portion and the first movable portion interference portion includes a tapered surface that is tilted with respect to three reference surfaces formed by three coordinate axes including the first coordinate axis and the second coordinate axis.

4. The electronic apparatus according to claim 3, further comprising:
a second movable portion that is provided at a position of the battery pack on the first end portion side in the first coordinate axis direction to be movable independently of the first movable portion in the second coordinate axis direction perpendicular to the first coordinate axis direction;
a second movable portion interference portion that is provided to the battery pack mounting portion, and interferes with the second movable portion and temporality retreats the second movable portion in the second coordinate axis direction from a third position in which the detachment of the battery pack from the battery pack mounting portion is restricted, to a fourth position in which the detachment is allowed when the battery pack is mounted; and
a latch to restrict a movement in a direction opposite to the retreat direction of the second movable portion that has been retreated by the interference with the second movable portion interference portion.

5. The electronic apparatus according to claim 4, wherein each of the second movable portion and the second movable portion interference portion includes a tapered surface that is tilted with respect to the three reference surfaces formed by the three coordinate axes including the first coordinate axis and the second coordinate axis.

6. The electronic apparatus according to claim 5, further comprising
a latch release operation portion to manually cancel a restriction state of the second movable portion, the restriction state being caused by the latch.

7. The electronic apparatus according to claim 4, wherein the latch includes a convex portion engaged with a V-shaped notch.

8. The electronic apparatus according to claim 2, wherein the first engagement portion includes at least one engagement hole.

9. The electronic apparatus according to claim 2, wherein the second engagement portion includes at least one engagement protrusion.

10. A battery pack detachable from an electronic apparatus that includes a display portion provided to be openable with respect to a main body via a hinge portion provided at a first end portion of the main body in a first coordinate axis direction and a battery pack mounting portion provided at the first end portion in the first coordinate axis direction, comprising:
a second connector portion connectable to a first connector portion provided at a position of the battery pack mounting portion on the first end portion side in the first coordinate axis direction;
a second engagement portion that is capable of engaging with a first engagement portion by being fit into the first engagement portion relatively in the first coordinate axis direction, the first engagement portion being provided at a second end portion of the battery pack mounting portion, the second end portion disposed opposite the first end portion in the first coordinate axis direction; and
a notch portion to avoid the hinge portion, the notch portion being provided at a first end portion of the battery pack, the first end portion of the battery pack corresponding in location to the first end portion of the main body in the first coordinate axis direction.

11. The electronic apparatus according to claim 1, further comprising
a concave engagement portion disposed at the first end portion of the battery pack mounting portion in the first coordinate axis direction; and
a convex engagement portion disposed on the battery pack and capable of engaging with the concave engagement portion by being fit into the concave engagement portion.

12. The battery pack according to claim 10, further comprising:
a first movable portion that is provided at a position of the battery pack on the first end portion side in the first coordinate axis direction to be movable in a second coordinate axis direction perpendicular to the first coordinate axis direction; and
a bias portion to bias the first movable portion in a direction of the second coordinate axis.

13. The battery pack according to claim 12, wherein the first movable portion includes a tapered surface that is tilted with respect to three reference surfaces formed by three coordinate axes including the first coordinate axis and the second coordinate axis.

14. The battery pack according to claim 13, further comprising:
a second movable portion that is provided at a position of the battery pack on the first end portion side in the first coordinate axis direction to be movable independently of the first movable portion in the second coordinate axis direction perpendicular to the first coordinate axis direction; and
a latch to restrict a movement of the second movable portion in a direction of the second coordinate axis.

15. The battery pack according to claim 14, wherein the second movable portion includes a tapered surface that is tilted with respect to the three reference surfaces formed by the three coordinate axes including the first coordinate axis and the second coordinate axis.

16. The battery pack according to claim 14, wherein the latch includes a convex portion engaged with a V-shaped notch.

* * * * *